(12) United States Patent
Crawford et al.

(10) Patent No.: US 8,346,217 B2
(45) Date of Patent: Jan. 1, 2013

(54) SYSTEMS, METHODS AND APPARATUS FOR CONTROLLING ACCESS TO MOBILE DEVICES

(75) Inventors: Carmela R. Crawford, Manhattan, NY (US); John S. Nell, Manhattan, NY (US)

(73) Assignee: Knowledge Solutions, LLC, New Hyde Park, NY (US)

( * ) Notice: Subject to any disclaimer, the term of this patent is extended or adjusted under 35 U.S.C. 154(b) by 0 days.

(21) Appl. No.: 13/031,266

(22) Filed: Feb. 21, 2011

(65) Prior Publication Data

US 2012/0214442 A1    Aug. 23, 2012

(51) Int. Cl.
*H04M 1/66* (2006.01)
(52) U.S. Cl. ............. 455/411; 455/410; 726/18; 726/17
(58) Field of Classification Search ............ 455/410–411; 713/155–186; 380/247–258; 726/2–21, 726/26–30; 705/18, 50, 64, 67; 379/903
See application file for complete search history.

(56) References Cited

U.S. PATENT DOCUMENTS

| | | | |
|---|---|---|---|
| 6,026,491 A | 2/2000 | Hiles | |
| 6,253,328 B1 | 6/2001 | Smith, Jr. | |
| 6,509,847 B1 | 1/2003 | Anderson | |
| 6,859,878 B1 | 2/2005 | Kerr | |
| 6,954,862 B2 | 10/2005 | Serpa | |
| 7,219,368 B2 | 5/2007 | Juels | |
| 7,434,061 B2 | 10/2008 | Moseley | |
| 7,522,723 B1 | 4/2009 | Shaik | |
| 2003/0158815 A1* | 8/2003 | Yoshida et al. .................. | 705/50 |
| 2004/0034801 A1 | 2/2004 | Jaeger | |
| 2008/0184362 A1 | 7/2008 | Kumhyr | |
| 2008/0282185 A1 | 11/2008 | Blass | |
| 2008/0320310 A1* | 12/2008 | Florencio et al. ............. | 713/184 |
| 2009/0265773 A1 | 10/2009 | Schultz | |
| 2009/0305667 A1* | 12/2009 | Schultz ......................... | 455/410 |
| 2010/0031200 A1 | 2/2010 | Chen | |
| 2011/0238755 A1* | 9/2011 | Khan et al. .................... | 709/204 |

OTHER PUBLICATIONS

Steven Furnell and Leith Zekri, "Replacing passwords: in search of the secret remedy", Network Security, Jan. 2006, pp. 4-8.
Office Action in U.S. Appl. No. 13/295,095, notification date Feb. 7, 2012, 15 pages.
Coskun, B. and Herley, C., "Can 'Something You Know' Be Saved?," Information Security, 2008, pp. 421-440.
Jakobsson, M., Stolterman, E., Wetzel, S., and Yang, L., "Love and Authentication," In Proceeding of the Twenty-Sixth Annual SIGCHI Conference on Human Factors in Computing Systems (Florence, Italy, Apr. 5-10, 2008) (CHI 2008), ACM, 197-200, New York, NY.
Mike Just, "Designing and Evaluating Challenge-Question Systems," IEEE Security and Privacy, Sep. 2004, vol. 2, No. 5, pp. 32-39.
Lawrence O'Gorman, Amit Bagga, and Jon Bentley, "Query-directed passwords," Computers & Security, Oct. 2005, pp. 546-560, vol. 24, Issue 7.

(Continued)

*Primary Examiner* — Patrick Edouard
*Assistant Examiner* — Ronald Eisner
(74) *Attorney, Agent, or Firm* — Michael D. Downs; Fincham Downs, LLC

(57) ABSTRACT

Systems, apparatus, methods and articles of manufacture provide for controlling access to one or more functions of a mobile device, or other computing device, based on information about activities of a user.

36 Claims, 9 Drawing Sheets

OTHER PUBLICATIONS

Weinshall, D. and Kirkpatrick, S., "Passwords you'll never forget, but can't recall," Extended Abstracts on Human Factors in Computing Systems (Vienna, Austria, Apr. 24-29, 2004) (CHI 2004), pp. 1399-1402, New York, NY.

Farzaneh Asgharpour and Markus Jakobsson, "Adaptive Challenge Questions Algorithm in Password Reset/Recovery," In First International Workshop on Security for Spontaneous Interaction: IWIISI'07, Innsbruck, Austria, Sep. 2007, 6 pages.

Toomim, M., Zhang, X., Fogarty, J., and Landay, J.A., "Access control by testing for shared knowledge," In Proceeding of the Twenty-Sixth Annual SIGCHI Conference on Human Factors in Computing Systems (Florence, Italy, Apr. 5-10, 2008) (CHI 2008), ACM, pp. 193-196, New York, NY.

Ariel Rabkin, "Personal knowledge questions for fallback authentication: Security questions in the era of Facebook," Symposium on Usable Privacy and Security (SOUPS) 2008, Jul. 23-25, 2008, Pittsburgh, PA, USA.

\* cited by examiner

300

| APPLICATION TYPE | APPLICATION DATA |
|---|---|
| CALL LOG | OUTGOING CALL / MICHELLE DOE / 2010-09-30 09:30:00 / 15 MINS. |
| CALL LOG | INCOMING CALL / FLOYD SMITHERS / 2010-10-01 19:40:00 / 7 MINS. |
| EMAIL | TO: MARIA LOPEZ / 2010-09-30 / 4 TIMES |
| STAR ATTACK GAME | NEW HIGH SCORE 14,000 / 2010-10-01 / 6 MINS. |
| CALENDAR | USER ADDED RECURRING MEETING / WEEKLY / TUESDAY 10AM / JOHN DOE, MARIA LOPEZ, SUSAN SMITH |
| CALENDAR | USER ATTENDEE OF RECURRING MEETING / 2010-10-01 / 4PM – 5PM |
| VIDEO PLAYER | VIEWED "CAT WRITES NOVEL" / 2010-10-02 / 3 MINS |
| SEARCH | SEARCH TERMS: CAR DEALER CLEVELAND RESULTS: THREE WEBSITES; ONE ENTRY IN CONTACTS |
| CONTACTS | NAME: CHARLES BROWN / BIRTHDAY: 1970-02-04 |
| LOCATION | DMS 40° 42' 35.46" N 74° 03' 05.40" W |

FIG. 3

| CHALLENGE INFORMATION TYPE | CHALLENGE TEMPLATE | SECURITY LEVEL | CHALLENGE FORMAT |
|---|---|---|---|
| CALL LOG | DID YOU CALL <CONTACT NAME1> AT <NUMBER1> DURING <TIME PERIOD1>? | MEDIUM | YES / NO |
| CALL LOG | OF THE FOLLOWING, WHO DID YOU CALL THIS WEEK AT <NUMBER1>? | HIGH | MULTIPLE CHOICE |
| ○ | ○ | ○ | ○ |
| ○ | ○ | ○ | ○ |
| ○ | ○ | ○ | ○ |
| EMAIL | DID YOU EMAIL <CONTACT1> MORE THAN <#> TIMES YESTERDAY? | LOW | YES / NO |
| CONTACTS | IDENTIFY <CONTACT NAME1> IN THE FOLLOWING PICTURES: | MEDIUM | MULTIPLE CHOICE (IMAGE) |
| SEARCH HISTORY | OF THE FOLLOWING, IDENTIFY THE SEARCH YOU MADE DURING <TIME PERIOD1> ON <WEBSITE1>: | MEDIUM | YES / NO |

SYSTEMS, METHODS AND APPARATUS FOR CONTROLLING ACCESS TO MOBILE DEVICES

BRIEF DESCRIPTION OF THE DRAWINGS

An understanding of embodiments described in this disclosure and many of the attendant advantages may be readily obtained by reference to the following detailed description when considered with the accompanying drawings, wherein:

FIG. 3 is a diagram of a database according to an embodiment of the present invention;

FIG. 4 is a diagram of a database according to an embodiment of the present invention;

DETAILED DESCRIPTION

A. Introduction

Figure 1A:
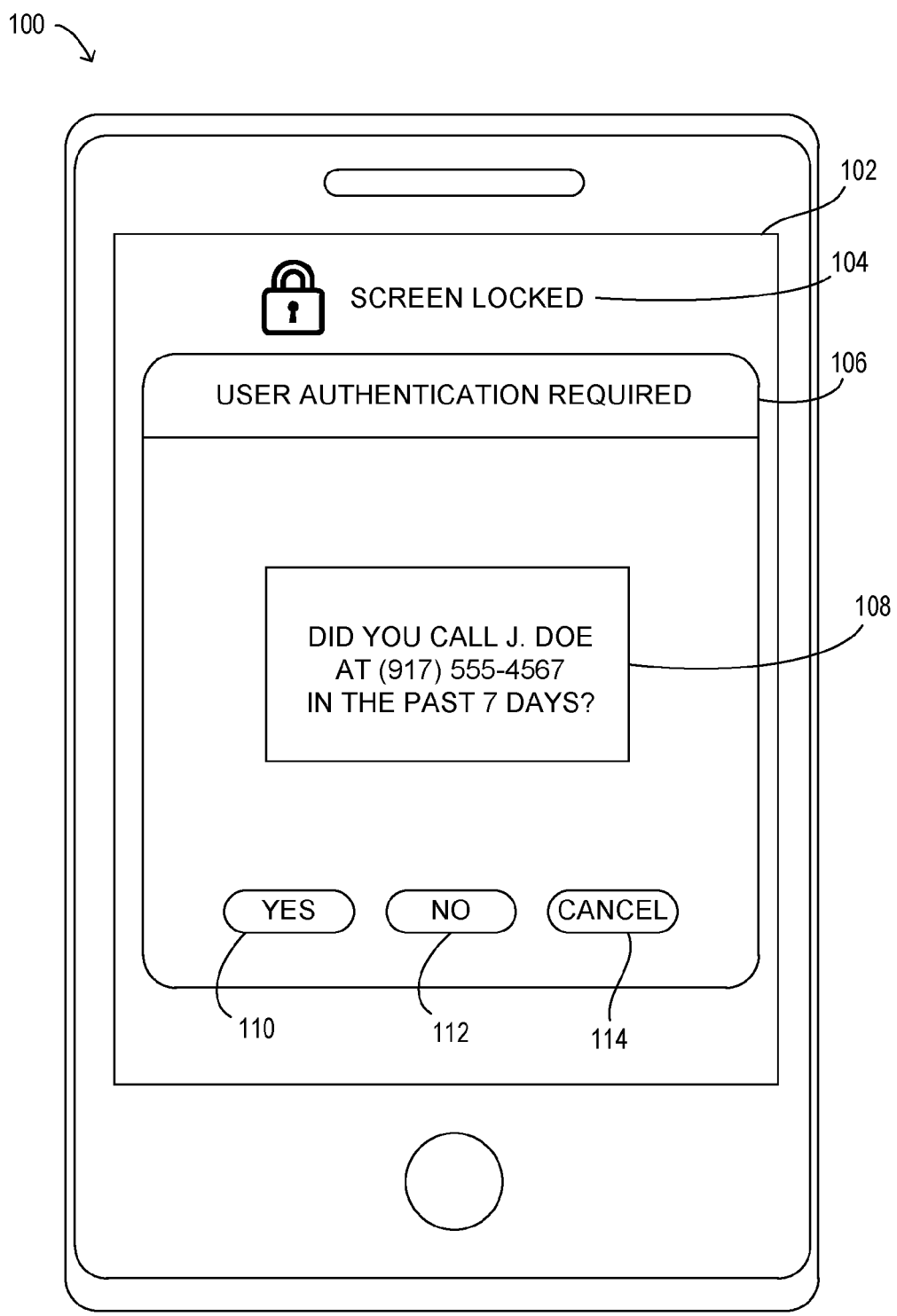
FIG. 1A is a diagram of an example user interface according to an embodiment of the present invention.

Applicants have recognized that, in accordance with some embodiments described in this disclosure, some users of mobile devices, including but not limited to mobile telephones, cellular telephones, GPS navigation devices, smart phones such as a BLACKBERRY, PALM, WINDOWS 7, IPHONE, or DROID phone, tablet computers such as an IPAD by APPLE, SLATE by HP, IDEAPAD by LENOVO, or XOOM by MOTOROLA, and other types of handheld, wearable and/or portable computing devices, may find it beneficial to have access to such computing devices (and/or to one or more functions of such computing devices) restricted and controlled in a manner that does not require the user to memorize a predefined password or passwords in order to gain access to the device. Other types of mobile devices are discussed in this disclosure, and still others suitable for various embodiments will be apparent to those of ordinary skill in light of this disclosure. Some users of other types of computing devices may find such functionality similarly beneficial. Such a capability may eliminate, in some instances, the necessity of having a user select (or be assigned) a password or PIN, receive the password from a security application or applet (e.g., receive a password generated by a security system that the user must store and/or remember), register or otherwise store the password (e.g., via an interface) with an authentication or other security software application and/or write down or otherwise record the password (e.g., for reference when the password is later required for access). Accordingly, some embodiments may provide a desired level of security while improving the usability of a computing device for the user.

It should be understood that the embodiments described herein are not limited to use with mobile devices (although the embodiments are described mainly with reference to such devices, for ease of understanding), but are equally applicable to any computing device, such as a personal or client computer in a home or office, for which the controlling of user access is preferred. Any reference to a "mobile device" herein should be understood to equally refer to any such computing device, as appropriate.

Applicants have still further recognized that although various solutions for requiring passwords or personal identification numbers (PINs) to access a mobile device are available, these solutions typically require a user to submit to a set up process in order to identify the information that the user must provide in order to gain the desired access (e.g., an account password), and the user typically must remember such passwords (and sometimes multiple passwords for various individual applications and functions). Passwords that are created or generated by a user or another entity (e.g., a password program) may be difficult for some types of users to remember, which may result in users having to reset their passwords, write down their passwords (so they do not have to remember), or use the same password for multiple systems (e.g., in order to minimize the number of passwords they must remember). As a result, reliance on such passwords may be inefficient and/or a security risk. Even where systems may provide for additional security procedures to address such deficiencies, such as by requiring answers to security questions (e.g., in addition to entering a password), providing a supplemental password, code or PIN, or contacting a user (e.g., via email, via phone) to provide an authentication code that the user must then enter, such additional measures may suffer from deficiencies. For example, just as in setting up passwords, creating additional questions often requires user input to set-up and establish questions/answers, and the questions are typically predefined and static. In contrast, some embodiments described in this disclosure allow for an authentication system that requires minimal or no initial user set up or ongoing involvement (e.g., no requirement of the user to change a password periodically), and/or may generate or change authentication challenges as frequently as desired (e.g., based on information about recent activities) and thereby make it more difficult or expensive for a third party to acquire or derive either the authentication challenges or the correct answers to authentication challenges. Some types of users and providers of authentication systems and applications may find one or more embodiments described herein to be advantageous in overcoming one or more of the deficiencies noted above.

Applicants have still further recognized that some solutions exist for testing whether an entity attempting to access one or more functions of a computing device (e.g., attempting to access a web page) is a human or another computing device. Anti-bot, or human authentication programs, such as those by CAPTCHA, that test based on the ability of humans to recognize images of words or objects that computer programs cannot, are not generally designed to authenticate a human user based on the personal knowledge of the human user, and reject, e.g., human users not evidencing that personal knowledge. In accordance with some embodiments, a determined authentication challenge (e.g., based on information derived by an authentication system from information that has not been established with the system by a user but should be in the personal knowledge of an authorized user) does not include a human authentication challenge designed to allow access only to human users.

In accordance with some embodiments, systems, apparatus, methods and articles of manufacture provide for determining information about at least one activity of a user, determining based on the determined information at least one authentication challenge and/or at least one associated, acceptable or correct response to an authentication challenge, receiving an indication of an attempt to access a computing device (e.g., a cell phone or smart phone), and presenting the at least one authentication challenge via an interface of the computing device. In some embodiments, at least one response to the at least one authentication challenge is received (e.g., via the interface of the computing device).

In one or more embodiments, a received response may be compared to a response associated with an authentication challenge, and access is provided to the computing device if the received response matches the associated response.

One or more embodiments, systems, apparatus, methods and articles of manufacture provide for generating, receiving or otherwise determining a correct response to a corresponding authentication challenge (e.g., based on information associated with any one or more of various activities of a user), and storing an indication of the correct response (e.g., at a computing device and/or at a remote server computer).

In some embodiments, an authentication challenge may be determined before determining one or more corresponding correct responses; in some embodiments, one or more responses (e.g., intuitive passwords) may be determined before generating one or more corresponding authentication challenges. One or more embodiments, systems, apparatus, methods and articles of manufacture provide for transmitting or otherwise providing an authentication challenge to user (e.g., transmitting a stored authentication challenge), receiving a response of a user to the challenge, and deriving or generating one or correct responses after receiving the response of the user (e.g., analyzing one or more data sources to determine a correct, current answer to the provided challenge).

In accordance with some embodiments, systems, apparatus, methods and articles of manufacture provide for storing information about use of a mobile device by a user, determining at least one authentication challenge based on the stored information, detecting an event at the mobile device requiring an authentication challenge in response, and presenting the authentication challenge via an interface of the mobile device in response to detecting the event.

Some embodiments described in this disclosure provide for selecting information for authenticating access of a user to a mobile device, in which the information preferably is not information that had been previously registered (e.g., for the purposes of authenticating access). For example, it may be advantageous, in some embodiments, to utilize information (e.g., information about messages and/or contacts of a mobile device user) that does not include a stored user password or passcode for controlling access (e.g., a stored PIN for unlocking a smartphone touchscreen; an account or profile password for access to a website). In another example, the selected information does not include information submitted by the user specifically for use as a password (e.g., providing a reference fingerprint, password and/or facial image in response to a request to submit or create a password for accessing an account, application or mobile device function(s)). Some embodiments provide further for creating, in response to a trigger event, an authentication challenge for the user, based on the selected information. For example, a trigger event may include detection of user input (e.g., a user actuates a touchscreen or button element of a wireless phone to begin the process of unlocking the locked wireless phone).

In accordance with some embodiments, systems, apparatus, methods and articles of manufacture provide for controlling access to a mobile device based on various types of information, including but not limited to (i) a call log or other communications or message log, (ii) interaction(s) of a user with a mobile device (e.g., what functions or applications are used, time of use), (iii) calendar and/or task events, (iv) use of media (e.g., music files, audiobook files, e-book files and/or video files, and playlists and/or preferences for such media), (v) membership information, (vi) purchases and other types of financial or transactional information (e.g., purchases made from online sellers), (vii) Internet, database and/or device searches, and (viii) location information (e.g., GPS location of a mobile device).

In accordance with some embodiments, systems, apparatus, methods and articles of manufacture provide for storing information about use of a mobile device by a user; determining at least one authentication challenge based on the stored information; detecting an event at the mobile device that triggers an authentication challenge; and presenting the determined authentication challenge via an interface of the mobile device.

In accordance with some embodiments, systems, apparatus, methods and articles of manufacture provide for accessing a communications log(e.g., a call log, a database of emails, a database of instant messages and/or a database of SMS messages) for a user of a mobile device; generating a challenge question and associated answer based on at least one communication stored in the communications log; presenting the challenge question via an interface of the mobile device, the mobile device having at least one function (e.g., a display screen, a camera, a keypad, an email program, a phone program) to which access is currently denied; receiving a response to the challenge question; and determining whether to provide access to the function of the mobile device based on the response. Some embodiments may provide for determining if the response matches the associated answer; continuing to deny access to the mobile device function if the response does not match; and allowing access to the mobile device function if the response does match the associated answer.

Some embodiments of the present invention provide for a method, an apparatus and a (transitory or non-transitory) computer readable medium (e.g., a computer readable memory) providing for storing information about use of a mobile device by a user; determining based on the stored information about use of the mobile device by the user at least one of (i) an authentication challenge and (ii) an associated, acceptable or correct response (e.g., an intuitive password) to an authentication challenge; detecting an event at the mobile device; and in response to detecting the event at the mobile device, presenting, via an interface of the mobile device, the authentication challenge based on the stored information about use of the mobile device by the user.

Some embodiments of the present invention provide for a method, an apparatus and a (transitory or non-transitory) computer readable medium (e.g., a computer readable memory) providing for selecting information for authenticating access of a user to a mobile device, in which the information was not submitted previously by the user for use as a password; detecting a trigger event via a mobile device; and in response to the trigger event, generating based on the selected information at least one of (i) an authentication challenge and (ii) an associated, acceptable or correct response (e.g., an intuitive password) to an authentication challenge.

Some embodiments of the present invention provide for a method, an apparatus and a (transitory or non-transitory) computer readable medium (e.g., a computer readable memory) providing for accessing a messaging log for a user of a mobile device having a function for which access is denied to the user; generating an authentication challenge and an associated answer to the authentication challenge (e.g., an intuitive password) based on at least one message stored in the messaging log; presenting the authentication challenge via an interface of the mobile device; and receiving a response to the challenge question via the interface of the mobile device. Some embodiments may provide additionally for comparing the received response to the associated answer or otherwise determining whether to grant access to the function to the user based on the received response and the associated answer (e.g., granting access if the received response matches an intuitive password derived by the authentication system).

In accordance with some embodiments, secured access to computing devices may be provided without relying on predefined or static passwords and challenge questions, personal identifying information and/or publicly available information. Some embodiments may require minimal or no initial user set-up, require no cryptographic code generation hardware or software, and may change frequently without requiring a user to learn and memorize a new password.

B. Terms and Definitions

Throughout the description that follows and unless otherwise specified, the following terms may include and/or encompass the example meanings provided in this section. These terms and illustrative example meanings are provided to clarify the language selected to describe embodiments both in the specification and in the appended claims, and accordingly, are not intended to be limiting.

As used herein, "computing device" may refer to, without limitation, one or more personal computers, laptop computers, set-top boxes, cable boxes, network storage devices, media servers, automatic teller machines (ATM), kiosks, personal media devices, communications devices, display devices, financial transaction systems, vehicle or dashboard computer systems, televisions, stereo systems, video gaming systems, gaming consoles, cameras, video cameras, MP3 players, mobile devices, mobile telephones, cellular telephones, GPS navigation devices, smart phones, tablet computers, portable video players, satellite media players, satellite telephones, wireless communications devices, personal digital assistants (PDA), point of sale (POS) terminals, credit card transaction systems, online or Internet purchase systems, and/or credit card or other financial account card transaction systems.

As used herein, the term "access to" when used in reference to a user's access to (or attempt to access) a computing device (e.g., a mobile device) may refer to, without limitation, providing the user with access to, enabling for the user and/or making available to the user, one or more functions of the computing device. Some examples of functions of a computing device, as used in this disclosure, may refer to one or more components or capabilities of a computing device (e.g., whether enabled by hardware, software or a combination of hardware and software), such as one or more input devices, output devices, applications, instructions, programs, databases, menus, messages, storage devices, communications ports, interfaces, objects, buttons, and the like.

As used herein, the term "network component" may refer to a user or network device, or a component, piece, portion, or combination of user or network devices. Examples of network components may include a Static Random Access Memory (SRAM) device or module, a network processor, and a network communication path, connection, port, or cable.

In addition, some embodiments are associated with a "network" or a "communication network". As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration of type that is or becomes known. Communication networks may include, for example, one or more networks configured to operate in accordance with the Fast Ethernet LAN transmission standard 802.3-2002® published by the Institute of Electrical and Electronics Engineers (IEEE). In some embodiments, a network may include one or more wired and/or wireless networks operated in accordance with any communication standard or protocol that is or becomes known or practicable.

As used herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

C. Example Interfaces and Applications

Any or all of methods 500, 600 and 700, described below, and other methods described in this disclosure, may involve one or more interface(s), and the methods may include, in some embodiments, providing an interface through which a user may (i) submit a preference for a security level or other information that may be used in generating an authentication challenge, (ii) request or initiate access to a mobile device, (iii) receive or otherwise be presented with an authentication challenge (e.g., via audio, display and/or video output devices), and (iv) transmit or otherwise provide a response to an authentication challenge.

According to some embodiments, information may be derived from one or more activities of an individual (e.g., a user associated with a mobile device). For example, such activities may include, without limitation, making and/or receiving phone calls, sending and/or receiving emails/text messages, visiting websites, scheduling and/or accepting meetings or appointments, conducting Internet searches and/or searches of information stored on a mobile device, downloading and using applications and/or games, conducting online purchases. In one embodiment, at least one of the individual's activities comprises use by the individual of his or her mobile device (e.g., to send an SMS message on cell phone, to access an e-reader application on a tablet computer). The information may be presented to the user in the form of a challenge or question (or, in some embodiments, a series of such questions).

Questions may be derived from information stored and/or retrieved from one or more local and/or centralized data sources. Formats of questions (e.g., true/false, yes/no, multiple choice, fill in the blank, picture/image identification), sources of the data relied upon (e.g., phone calls, emails, contact lists, appointments) and the number or difficulty of questions asked could be based on user and/or system administrator preferences and/or the level of security desired (e.g., as reflected by the statistical likelihood of an unauthorized user guessing an answer correctly).

In one hypothetical example, a program being executed by a processor (e.g., embodied in a mobile device) queries a call log stored in a cell phone to identify calls meeting criteria of: (i) call duration greater than a predetermined threshold length (e.g., nine minutes) and (ii) the number called is associated with a contact in a contact management program such as OUTLOOK by MICROSOFT. The retrieved information meeting the criteria includes information about a call made using the phone to a contact, "John Doe", yesterday at John Doe's telephone number of (917) 555-4567.

FIG. 1A illustrates an example interface 106 by which an individual attempting to gain access to smart phone 100 may receive and respond to an authentication challenge. In this example, as indicated by notification 104, the smart phone 100 has gone into an inactive state (e.g., after a predetermined period of time has passed without receiving any user input) and the example touchscreen display 102 of the phone has been "locked" (e.g., access to applications and non-emergency phone functionality is prohibited). Example elements of interface 106 include an authentication challenge message 108 and input elements 110, 112 and 114 for responding to the authentication challenge. In the example, the individual is required to confirm, or not, that the named individual was called at the indicated telephone number within the indicated time period (e.g., the last seven days). If the individual answers the question correctly, the smart phone 100 is unlocked (e.g., access is granted to the smart phone's menus, home screen, applications, hardware buttons, software buttons, microphone, camera and/or other features). If the individual cancels or answers incorrectly, the display 102 remains locked.

Although certain types of information are illustrated in the example interface 106, those skilled in the art will understand that the interface 106 may be modified in order to provide for additional types of information (e.g., additional challenge questions) and/or to remove some of the illustrated types of information, as deemed desirable for a particular implementation.

Figure 1B:
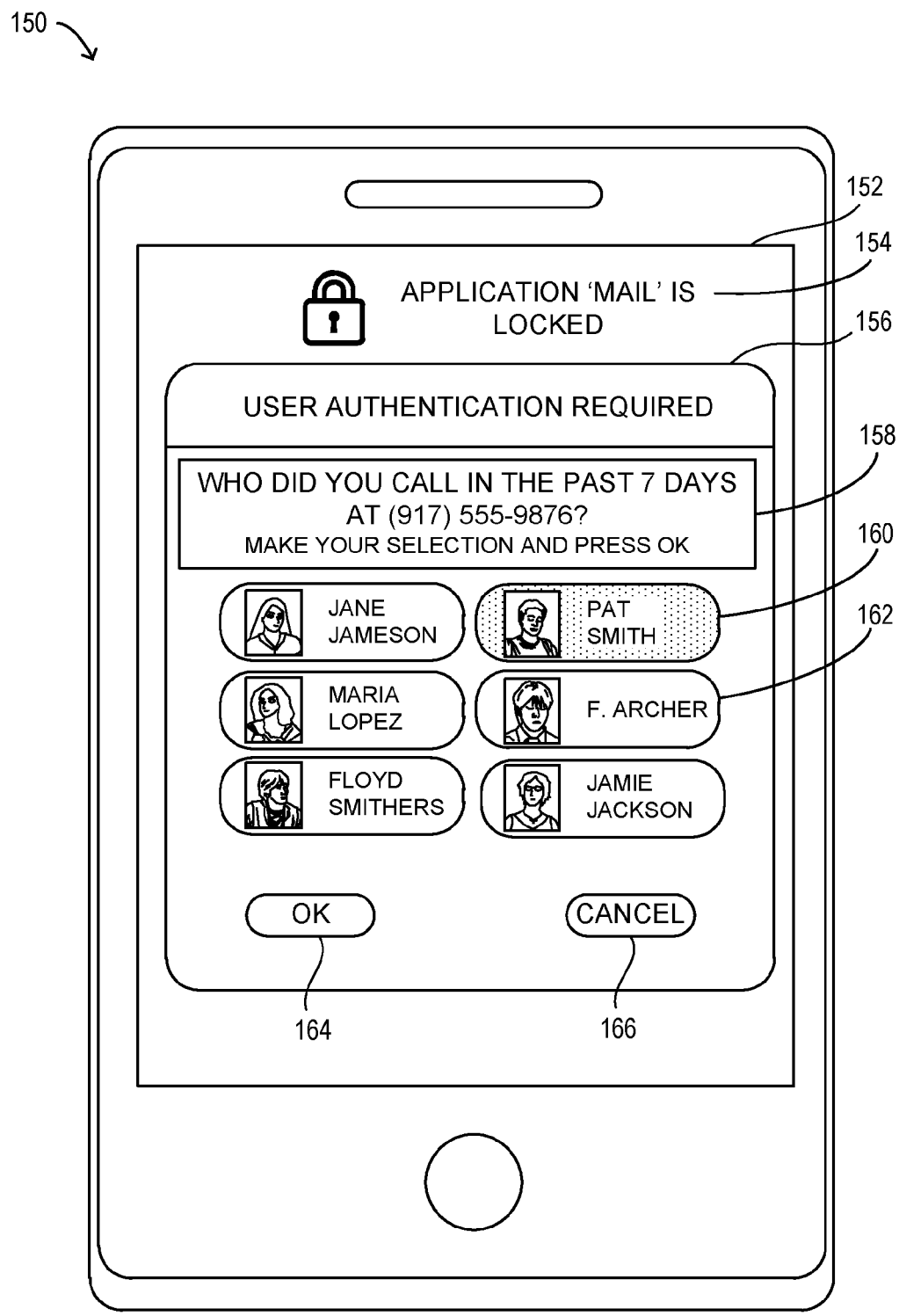
FIG. 1B is a diagram of an example user interface according to an embodiment of the present invention.

FIG. 1B illustrates another example interface 156 through which an individual attempting to gain access to smart phone 100 may receive and respond to an authentication challenge. In this example, as indicated by notification 154, a "Mail" application on smart phone 150 is locked and must be unlocked before it can be used (e.g., to secure against unauthorized use of an email account). Example elements of interface 156 include an authentication challenge message 158, selectable elements including elements 160 and 162 representing choices selectable (e.g., by a user touching the displayed element on the touchscreen 152) for responding to the authentication challenge, and input elements 164 and 166 for responding to the authentication challenge. In the example, the individual is required to identify, from a displayed listing of multiple possible contacts, including contacts identified by elements 160 and 162, one contact called by the owner of the smart phone at the indicated telephone number within the indicated time period. In the example, element 160 has been selected and is highlighted as a selected element. If the individual makes the correct selection and presses "OK" button 164, the Mail application is unlocked for use (e.g., access is granted to send and receive email, change application settings, etc.).

Although certain types of information are illustrated in the example interface 156, those skilled in the art will understand that the interface 156 may be modified in order to provide for additional types of information (e.g., additional challenge questions) and/or to remove some of the illustrated types of information, as deemed desirable for a particular implementation.

Although interface 100 and interface 150 are illustrated as different interfaces, those skilled in the art will readily understand, in light of the present disclosure, that the features and information of both interfaces, or a subset of such features and information, may be included in a single interface, screen display or application window. For example, a single interface window may be used for presenting and responding to both example questions.

D. General Systems and Structures

Figure 2A:
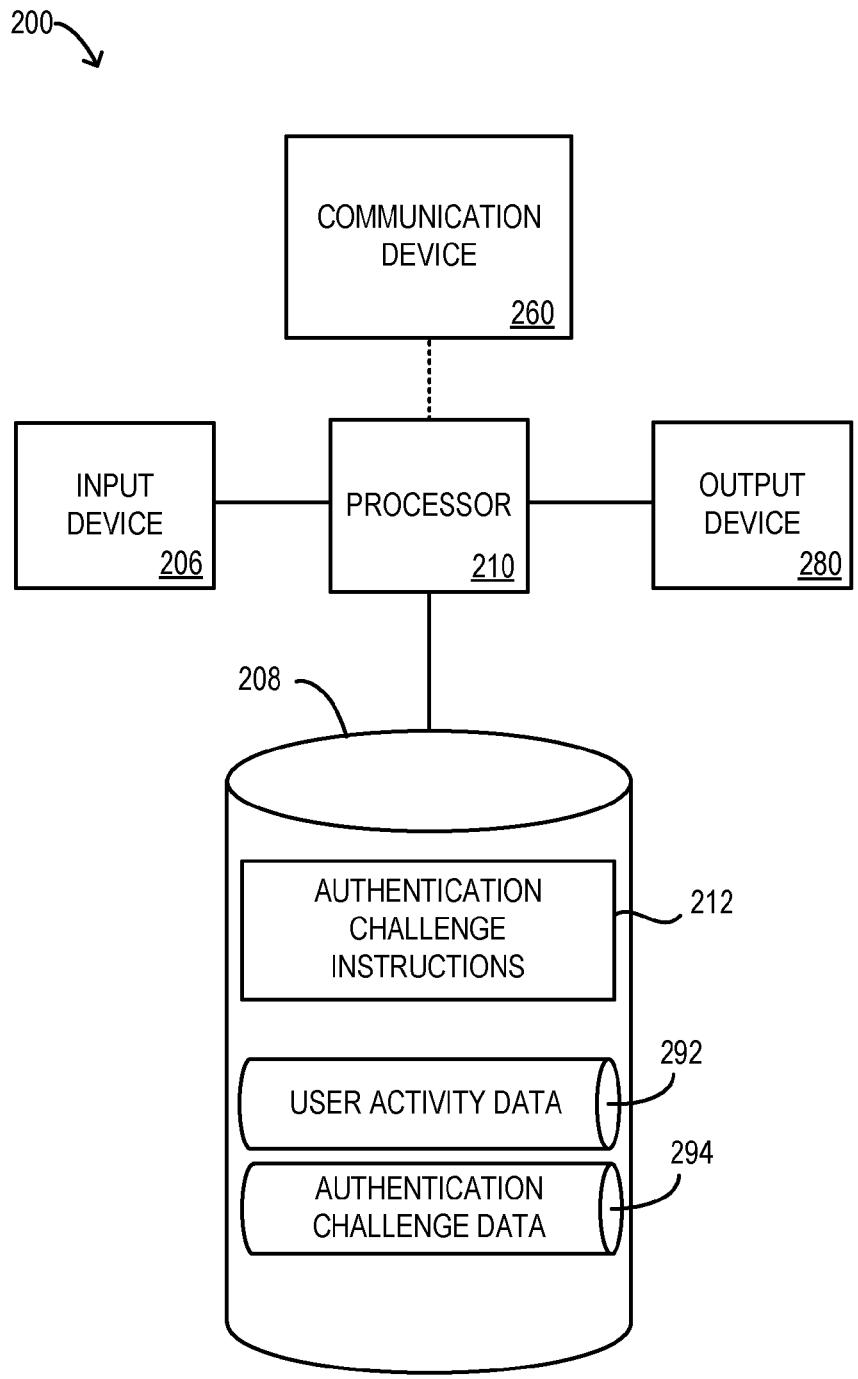
FIG. 2A is a diagram of a system according to an embodiment of the present invention.

Turning to FIG. 2A, a block diagram of an apparatus 200 according to some embodiments is shown. In some embodiments, the apparatus 200 may be similar in configuration and/or functionality to any of the smart phones 100 and 150, mobile devices 254, server computers 252 and/or third-party data devices 256 of FIG. 1A, FIG. 1B and/or FIG. 2B. The apparatus 200 may, for example, execute, process, facilitate, and/or otherwise be associated with any of the processes 500, 600, 700 described in conjunction with FIG. 5, FIG. 6 and FIG. 7 in this disclosure.

In some embodiments, the apparatus 200 may comprise an input device 206, a memory device 208, a processor 210, a communication device 260, and/or an output device 280. Fewer or more components and/or various configurations of the components 206, 208, 210, 260, 280 may be included in the apparatus 200 without deviating from the scope of embodiments described herein.

According to some embodiments, the processor 210 may be or include any type, quantity, and/or configuration of processor that is or becomes known. The processor 210 may comprise, for example, an Intel® IXP 2800 network processor or an Intel® XEON™ Processor coupled with an Intel® E7501 chipset. In some embodiments, the processor 210 may comprise multiple inter-connected processors, microprocessors, and/or micro-engines. According to some embodiments, the processor 210 (and/or the apparatus 200 and/or other components thereof) may be supplied power via a power supply (not shown) such as a battery, an Alternating Current (AC) source, a Direct Current (DC) source, an AC/DC adapter, solar cells, and/or an inertial generator. In the case that the apparatus 900 comprises a server such as a blade server, necessary power may be supplied via a standard AC outlet, power strip, surge protector, and/or Uninterruptible Power Supply (UPS) device.

In some embodiments, the input device 206 and/or the output device 280 are communicatively coupled to the processor 210 (e.g., via wired and/or wireless connections and/or pathways) and they may generally comprise any types or configurations of input and output components and/or devices that are or become known, respectively.

The input device 206 may comprise, for example, a keyboard that allows an operator of the apparatus 200 to interface with the apparatus 200 (e.g., by a phone user, such as to dial a call or send an email). The input device 206 may comprise, for example, a camera and/or a headphone jack. Input device 206 may include one or more of a key, touch screen, or other suitable tactile input device. Input device 206 may include a microphone comprising a transducer adapted to provide audible input of a signal that may be transmitted (e.g., to the processor 210 via an appropriate communications link) and/or an accelerometer or other device configured to detect movement of the device.

The output device 280 may, according to some embodiments, comprise a display screen and/or other practicable output component and/or device. The output device 280 may, for example, provide authentication challenges to a user attempting to gain access. Output device 280 may include one or more speakers comprising a transducer adapted to provide audible output based on a signal received (e.g., via processor 210).

According to some embodiments, the input device 206 and/or the output device 280 may comprise and/or be embodied in a single device such as a touch-screen display.

In some embodiments, the communication device 260 may comprise any type or configuration of communication device that is or becomes known or practicable. The communication device 260 may, for example, comprise a NIC, a telephonic device, a cellular network device, a router, a hub, a modem, and/or a communications port or cable. In some embodiments, the communication device 260 may be coupled to provide data to a telecommunications device. The communication device 260 may, for example, comprise a cellular telephone network transmission device that sends signals to a server in communication with a plurality of handheld, mobile and/or telephone devices. According to some embodiments, the communication device 260 may also or alternatively be coupled to the processor 210.

Communication device 260 may include, for example, a receiver and a transmitter configured to communicate via signals according to one or more suitable data and/or voice communication systems. In some embodiments, the communication device 260 may comprise an IR, RF, Bluetooth™, and/or Wi-Fi® network device coupled to facilitate communications between the processor 210 and another device (such as one or more mobile devices, server computers, central controllers and/or third-party data devices). For example, communication device 260 may communicate voice and/or data over mobile telephone networks such as GSM, CDMA, CDMA2000, EDGE or UMTS. Alternately, or in addition, communication device 260 may include receiver/transmitters for data networks including, for example, any IEEE802.x network such as WiFi or Bluetooth™.

The memory device 208 may comprise any appropriate information storage device that is or becomes known or available, including, but not limited to, units and/or combinations of magnetic storage devices (e.g., a hard disk drive), optical storage devices, and/or semiconductor memory devices such as Random Access Memory (RAM) devices, Read Only Memory (ROM) devices, Single Data Rate Random Access Memory (SDR-RAM), Double Data Rate Random Access Memory (DDR-RAM), and/or Programmable Read Only Memory (PROM).

The memory device 208 may, according to some embodiments, store authentication challenge instructions 212, user activity data 292 and/or authentication challenge data 294. In some embodiments, the authentication challenge instructions 212 may be utilized by the processor 210 to provide output information via the output device 280 and/or the communication device 260 (e.g., via the user interfaces 100 and/or 150 of FIG. 1A and FIG. 1B, respectively).

According to some embodiments, authentication challenge instructions 212 may be operable to cause the processor 210 to process user activity data 292 and authentication challenge data 294 as described herein.

Any or all of the exemplary instructions and data types described herein and other practicable types of data may be stored in any number, type, and/or configuration of memory devices that is or becomes known. The memory device 208 may, for example, comprise one or more data tables or files, databases, table spaces, registers, and/or other storage structures. In some embodiments, multiple databases and/or storage structures (and/or multiple memory devices 208) may be utilized to store information associated with the apparatus 200. According to some embodiments, the memory device 208 may be incorporated into and/or otherwise coupled to the apparatus 200 (e.g., as shown) or may simply be accessible to the apparatus 200 (e.g., externally located and/or situated).

In some implementations, the apparatus 200 comprises a touch-sensitive display. The touch-sensitive display may be implemented with liquid crystal display (LCD) technology, light emitting polymer display (LPD) technology, or some other display technology. The touch-sensitive display can be sensitive to haptic and/or tactile contact with a user. In some embodiments, the touch-sensitive display may comprise a multi-touch-sensitive display that can, for example, process multiple simultaneous touch points, including processing data related to the pressure, degree, and/or position of each touch point. Such processing facilitates gestures and interactions with multiple fingers, chording, and other interactions. Alternately or in addition, other touch-sensitive display technologies may be used, such as, without limitation, a display in which contact is made using a stylus or other pointing device.

In some embodiments, the apparatus 200 may be adapted to display one or more graphical user interfaces on a display (e.g., a touch-sensitive display) for providing the user access to various system objects and/or for conveying information to the user. Some examples of system objects include device functions, applications, windows, files, alerts, events, or other identifiable system objects.

In some embodiments, the apparatus 200 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the apparatus 200 (e.g., embodied as a mobile device) or provided as a separate device that can be coupled to the apparatus 200 through an interface (e.g., via communication device 260) to provide access to location-based services.

The memory device 208 may also store communication instructions to facilitate communicating with one or more additional devices, one or more computers and/or one or more servers. The memory device 208 may include graphical user interface instructions to facilitate graphic user interface processing; sensor processing instructions to facilitate sensor-related processing and functions; phone instructions to facilitate phone-related processes and functions; electronic messaging instructions to facilitate electronic-messaging related processes and functions; web browsing instructions to facilitate web browsing-related processes and functions; media processing instructions to facilitate media processing-related processes and functions; GPS/Navigation instructions to facilitate GPS and navigation-related processes and instructions; camera instructions to facilitate camera-related processes and functions; and/or other software instructions to facilitate other processes and functions. The memory device 208 may also store other software instructions, such as web video instructions to facilitate web video-related processes and functions; and/or web shopping instructions to facilitate web shopping-related processes and functions. In some embodiments, the media processing instructions may be divided into audio processing instructions and video processing instructions to facilitate audio processing-related processes and functions and video processing-related processes and functions, respectively.

Figure 2B:
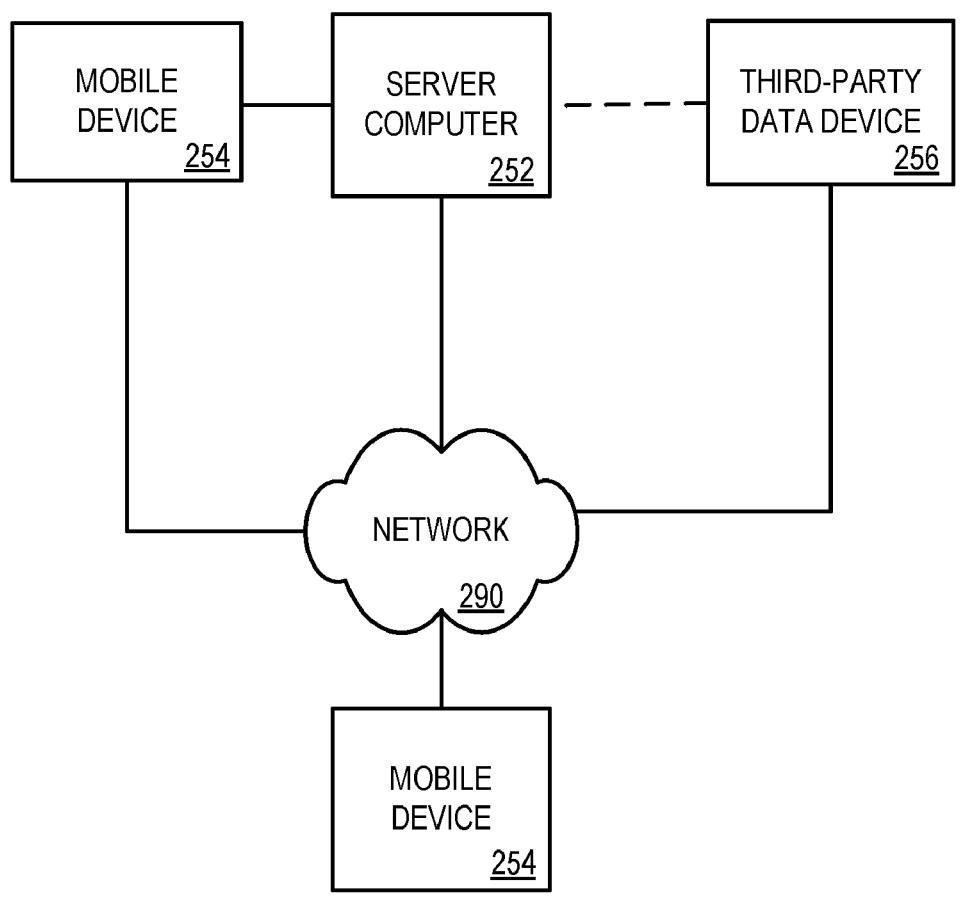
FIG. 2B is a diagram of a system according to an embodiment of the present invention.

FIG. 2B depicts a block diagram of an example system 250 according to some embodiments. The system 250 may comprise one or more mobile devices 254 in communication with a controller or server computer 252 via a network 290. Typically a processor (e.g., one or more microprocessors, one or more microcontrollers, one or more digital signal processors) of a mobile device 254 or server computer 252 will receive instructions (e.g., from a memory or like device), and execute those instructions, thereby performing one or more processes defined by those instructions. Instructions may be embodied in, e.g., one or more computer programs and/or one or more scripts.

In some embodiments a server computer 252 and/or one or more of the mobile devices 254 stores and/or has access to data useful for controlling access to one or more functions of a mobile device 254. Such information may include one or more of: (i) device functions data, (ii) authentication challenge data and (iii) user information data According to some embodiments, any or all of such data may be stored by or provided via one or more optional third-party data devices 256 of system 250. A third-party data device 256 may comprise, for example, an external hard drive or flash drive connected to a server computer 252; a remote third-party computer system for storing and serving data for use in generating authentication challenge questions, managing authentication challenge questions, receiving and/or analyzing responses to authentication challenges; or a combination of such remote and local data devices. A third-party entity (e.g., a party other than an owner and/or operator, etc., of the server computer 252, mobile device 254) such as a third-party vendor collecting data on behalf of the owner may, for example, monitor requests from a plurality of mobile devices 254 for authentication challenges. In one embodiment, one or more companies and/or end users may subscribe to or otherwise purchase data (e.g., challenge question template data) from a third party and receive the data via the third-party data device 256.

In some embodiments, a mobile device 254 may comprise a mobile or portable computing device such as a smart phone (e.g., the IPHONE manufactured by APPLE, the BLACKBERRY manufactured by RESEARCH IN MOTION, the PRE manufactured by PALM or the DROID manufactured by MOTOROLA), a Personal Digital Assistant (PDA), cellular telephone, laptop or other portable computing device and an application for controlling access is stored locally on the mobile device 254, which may access information (e.g., authentication challenge questions) stored on, or provided via, the server computer 252. In another embodiment, the server computer 252 may store some or all of the program instructions for authenticating and controlling access, and the mobile device 254 may execute the application remotely via the network 290 and/or download from the server computer 252 (e.g., a web server) some or all of the program code for executing one or more of the various functions described in this disclosure.

In one embodiment, a server computer may not be necessary or desirable. For example, some embodiments described in this disclosure may be practiced on one or more devices (e.g., a smartphone with a stand-alone application) without a central authority. In such an embodiment, any functions described herein as performed by a server computer and/or data described as stored on a server computer may instead be performed by or stored on one or more such devices, such as a mobile device or table computer. Additional ways of distributing information and program instructions among one or more client computers 254 and/or server computers 252 will be readily understood by one skilled in the art upon contemplation of the present disclosure.

E. Databases

Referring to FIG. 3, a schematic illustration of an exemplary data structure 300 according to some embodiments is shown. In some embodiments, the exemplary data structure 300 may comprise a tabular representation illustrating an embodiment of the user activity data 292. The exemplary data structure 300 that is representative of the user activity data 292 includes a number of example records or entries, each of which defines data for a particular event associated with a particular user (e.g., conducted via a mobile device and/or other computing device). Those skilled in the art will understand that the user activity data 292 may include any number of entries. The exemplary data structure 300 of the user activity data 292 also defines fields for each of the entries or records, including: (i) an application type field and (ii) an application data field.

In one or more embodiments, the application type field allows for entry and storage of a plurality of identifiers corresponding to respective categories of, or specific, applications or services (e.g., phone and call log applications, appointment applications, gaming applications, email and other messaging applications, video and other media players, navigation applications, map and/or location applications). Similarly, the application data field allows for entry and storage of specific information corresponding to respective events, states, and/or statuses associated with the particular application or application type.

Some types of data that may be useful in deriving authentication challenges or questions and/or corresponding answers that may be dynamic and flexible include, without limitation:

Events (e.g., birthdays, anniversaries)
People/contacts (e.g., names, phone numbers, email addresses)
Places visited (e.g., vacations, airline/hotel reservations)
Activity driven (e.g., cell phone pictures, social networking website activity, camera phone, computer directory, download/websites, Internet and/or device searches, recently visited websites, tasks performed)
Location (e.g., GPS in phone/car, computer)
Music preferences/Music lists (e.g., music listened to)
Videos downloaded/Videos viewed
Movies downloaded/viewed/rented/searched
TV shows downloaded/taped/viewed/searched
Stocks tracked
Games purchased/played/dormant
Recently utilized applications
Recent purchases
Financial data (e.g., credit card purchases, a credit card bill)
Application settings
Emails received/sent/deleted
Phone calls incoming/outgoing/missed
Favorites lists (e.g., music, websites, videos)

Some examples of one or more data sources, such as may be stored by, accessible to and/or accessed via a computing device 200, mobile device 254, server computer 252 and/or third-party data device 256, and that may provide information about activities of a user useful in determining authentication challenges (and/or corresponding correct responses to such challenges), may include without limitation:

- a contact list
- an email log
- a communications log(e.g., including records of one or more of voice, SMS, MMS, IM, email and/or social networking messages)
- a text messaging log
- an instant messaging log
- a telephone log
- a credit card or other financial account issuer
- a credit card or other financial account bill or statement
- a credit card or other financial account processor or clearinghouse
- a communications service provider (e.g., a wireless communications carrier)
- an internet service provider
- an online picture website (e.g., SHUTTERFLY)
- an online or in-store rental retailer (e.g., NETFLIX, BLOCKBUSTER)
- a social networking website (e.g., FACEBOOK, LINKED IN)
- a search log (e.g., Internet search, search of a mobile device)

Although the identifiers provided in the example data structure 300 are text descriptions, it will be understood that such identifiers could be any alphanumeric or other type of identifier that uniquely identifies a particular type of activity (e.g., use of an application; use of a mobile device function).

Referring to FIG. 4, a schematic illustration of an exemplary data structure 400 according to some embodiments is shown. In some embodiments, the exemplary data structure 400 may comprise a tabular representation illustrating an embodiment of the authentication challenge data. The exemplary data structure 400 that is representative of the authentication challenge data includes a number of example records or entries, each of which defines information corresponding to a particular type of authentication challenge. Those skilled in the art will understand that the authentication challenge data 294 may include any number of entries. The exemplary data structure 400 of the authentication challenge data 294 also defines fields for each of the entries or records, including: (i) a challenge information field, (ii) a challenge template field, (iii) a security level field and (iv) a challenge format field.

In one or more embodiments, the challenge information field allows for entry and storage of an identifier corresponding to one or more respective applications or data sources. Although the identifiers provided in the example data structure 400 are text descriptions, it will be understood that such identifiers could be any alphanumeric or other type of identifier that uniquely identifies a particular application or data source.

In one or more embodiments, the challenge template field allows for entry and storage for a template challenge question, and may include one or more variable placeholders for replacing with the appropriate value(s) when a challenge is generated and/or stored. It will be readily understood that a variety of different challenge templates and formats may be available, in light of the present disclosure, as deemed appropriate for a particular implementation. Also, although FIG. 4 provides for templates, it will be readily understood that one or more generated questions (e.g., without variable placeholders but as would be presented to a user) may be stored in the same or one or more different databases.

Sample challenge questions, based on information derived as described in this disclosure, may be arranged in various ways. In one example, as depicted in FIG. 1A, a YES/NO question may ask if the user called a specific person at a specific number during a specific period. However, the authentication program may structure the question with any combination of the correct or incorrect contact name, correct or incorrect phone number and/or correct or incorrect time period. For example, the question may include the wrong name associated with a phone number the user actually did call during the indicated time period. In other examples, the question may include the wrong phone number but the correct name, or may have both the name and phone number incorrect.

In another example, with reference to FIG. 1B, multiple choice questions may be derived from names actually in a user's contact list, fictitious names (or names not in the user's contact list), incorrect combinations of real first names with real last names, or any combination of such variations.

Also as depicted in FIG. 1B, images, video and/or audio content may be employed. For instance, a user may be required to identify a particular individual by his picture (e.g., as may be stored in the user's contact list) and/or by his voice (e.g., by recognizing him in an audio file derived from a telephone conversation with the user). In one example, a user is given a name and asked if the name matches a provided picture. In another example a user may be shown a plurality of individuals and required to select a particular named individual. In another example, as depicted in FIG. 1B, a user is not given a name but is given other contextual clues (e.g., when a call was made, to what number) and presented with a plurality of pictures from which to select the right individual.

According to various embodiments, the format and content of the authentication challenge may vary, and may have the effect of increasing or decreasing the likelihood that an unauthorized user may be able to guess the answer to the challenge correctly (e.g., in accordance with a desired level of security). For example, the following listing of example authentication challenges provide varying degrees of complexity and/or security:

- Who did you call in the last 7 days? [Format: only photos provided from which to select]
- Who did you call in the last 7 days? [Format: photos and names provided (allowing for the possibility that erroneous names are listed with valid photos, and vice versa)]
- Who did you call at (917) 555-1234 within the last 7 days? [Format: photos and names provided]
- Who did you call at (917) 555-1234 within the last 7 days? [Format: photos only]
- Select the 3 people who have a birthday in the first three months of the year. [Format: only pictures appear].

According to some embodiments, one or more preferences of a user (e.g., a cell phone user, a security system administrator) may be received and stored (e.g., in one or more databases). In one embodiment, a user may define a desired level of security, and an indication of the preferred level of security may be stored (e.g., as part of a user or system profile associated with the user). When an authentication challenge is required, the challenge may be selected and/or generated based on the desired level of security. For example, the preferred level of security may be used to determine one or more of (i) the topic (e.g., the types of activities on which the challenge is based) of the challenge(s), (ii) the number of challenges that must be passed to gain access to the computing device, and (iii) the frequency with which new challenges are generated. It will be understood that, in addition to or in place of having a preferred level of security, a user may indicate a preference for one or more of the preceding factors. For instance, a user may specify a preferred security of "HIGH" and/or may indicate a preference for questions about telephone calls, and a minimum of two challenges before access is granted. Preferences of a user for any such factors may be input, for example, via an appropriate interface of a mobile device (e.g., using an application interface on a cell phone) and/or other computing device (e.g., a system administrator may set company-wide security policies applicable to all or certain defined groups of users).

F. Processes

In one example process in accordance with some embodiments, a call log, or information retrieved from a call log for a wireless phone, is stored (e.g., locally and/or remotely) by an authentication challenge program running on the wireless phone. An authentication challenge is determined based on the stored information. This may comprise selecting an authentication challenge (e.g., from a database of previously generated challenges) that is based on the stored use information and/or generating an authentication challenge.

In some embodiments, presentation of the authentication challenge may be in response to detection of one or more triggering events, such as initiation of or request for a computer log-in, computer network access, cell phone log-in or unlock attempt actuation of one or more buttons or other controls (e.g., touch-sensitive display, camera button) of a mobile or other computing device and/or an on-line purchase (e.g., via a website of an Internet retailer).

Figure 5:
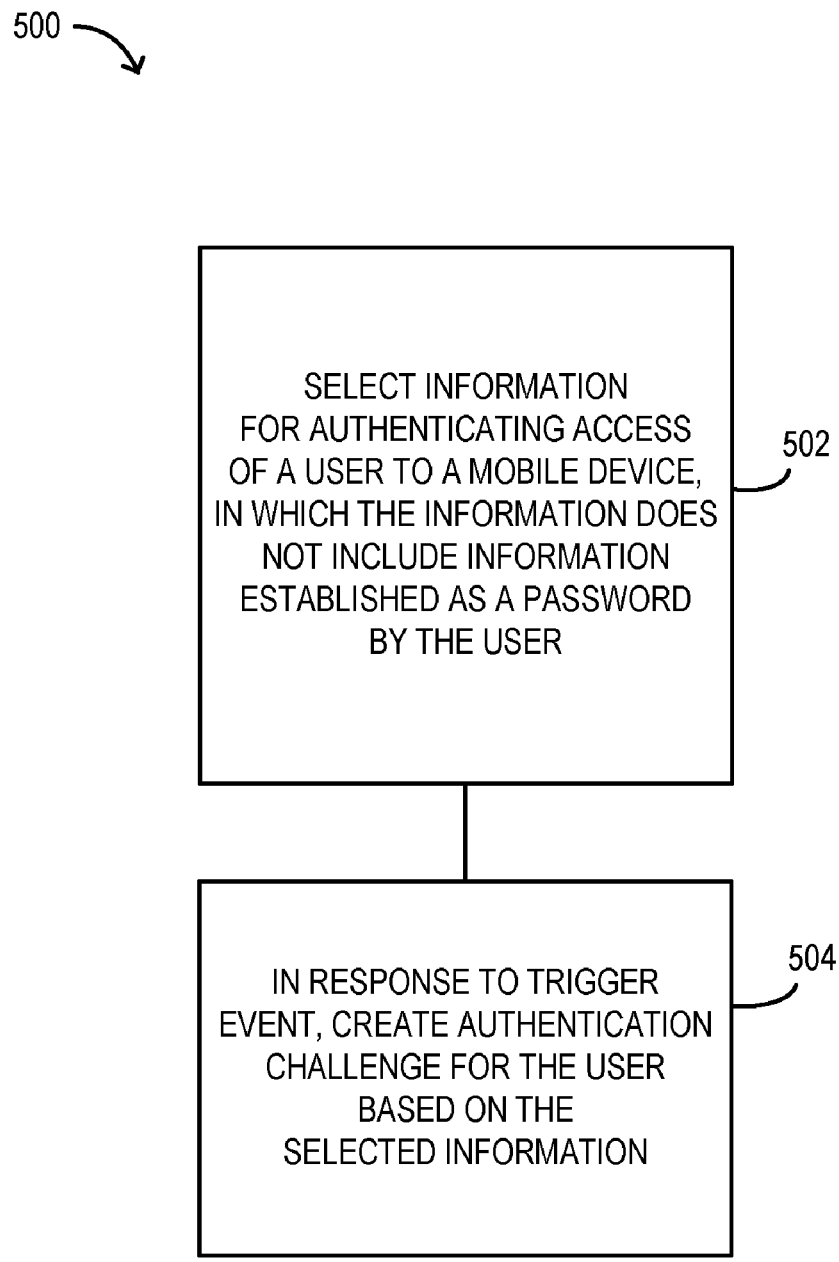
FIG. 5 is a diagram of a database according to an embodiment of the present invention.

Referring now to FIG. 5, a flow diagram of a method 500 according to some embodiments is shown. The method 500 will be described herein as being performed by a mobile device (e.g., a wireless or cellular phone). It should be noted that although some of the steps of method 500 may be described herein as being performed by a mobile device while other steps are described herein as being performed by another computing device, any and all of the steps may be performed by a single computing device which may be a mobile device, server computer, third-party data device or another computing device. Further any steps described herein as being performed by a particular computing device may be performed by a human or another computing device as appropriate.

According to some embodiments, the method 500 may comprise selecting information for authenticating access of a user to a mobile device, in which the information does not include information established as a password by the user, at 502. Selecting such information may comprise receiving, storing, data mining, analyzing and/or querying various types of information described in this disclosure, such as may be related to various activities of a user, including use of mobile device functions, applications and messaging capabilities, but other than information such as passwords, PINs, biometric markers (e.g., fingerprint, facial recognition analysis data) or other information submitted by, confirmed by (e.g., in response to a password suggested by a security application), or otherwise established by a user (e.g., specifically in response to a request of a security application to do so). In other words, at step 502 information may be selected dynamically from information available (e.g., by local or remote access) to a processor of a mobile device for executing authentication challenge instructions 212. In some embodiments the information, such as a history of phone calls, is likely to be remembered by the user (with appropriate contextual clues as necessary) but does not include a predefined password or challenge response established by a user for that purpose.

According to some embodiments, the method 500 may comprise, in response to a trigger event, creating an authentication challenge for the user based on the selected information, at 504. Trigger events may include various indications (e.g., received by processor 210) of an attempt or request (e.g., by an individual) to access one or more functions of a computing device. Examples of such indications may comprise, without limitation, a signal that a button or touch-sensitive display of a mobile device has been actuated and/or an indication that an element of a graphical user interface has been selected (e.g., in an attempt to initiate an application or other function).

In one example, where a particular phone call is selected for the basis on which to create an authentication question, and in direct response to a user trying to unlock a smart phone display screen, the authentication challenge application generates an authentication challenge question by replacing the variables in a question template with correct and/or incorrect values. Creating the questions, including determining how many contextual hints to provide or alternative choices to provide, may be further based on a level of security or format question preferred by a user and/or system administrator (e.g., such a preference may be stored in a database record accessible by the processor executing the authentication challenge instructions 212).

Figure 6:
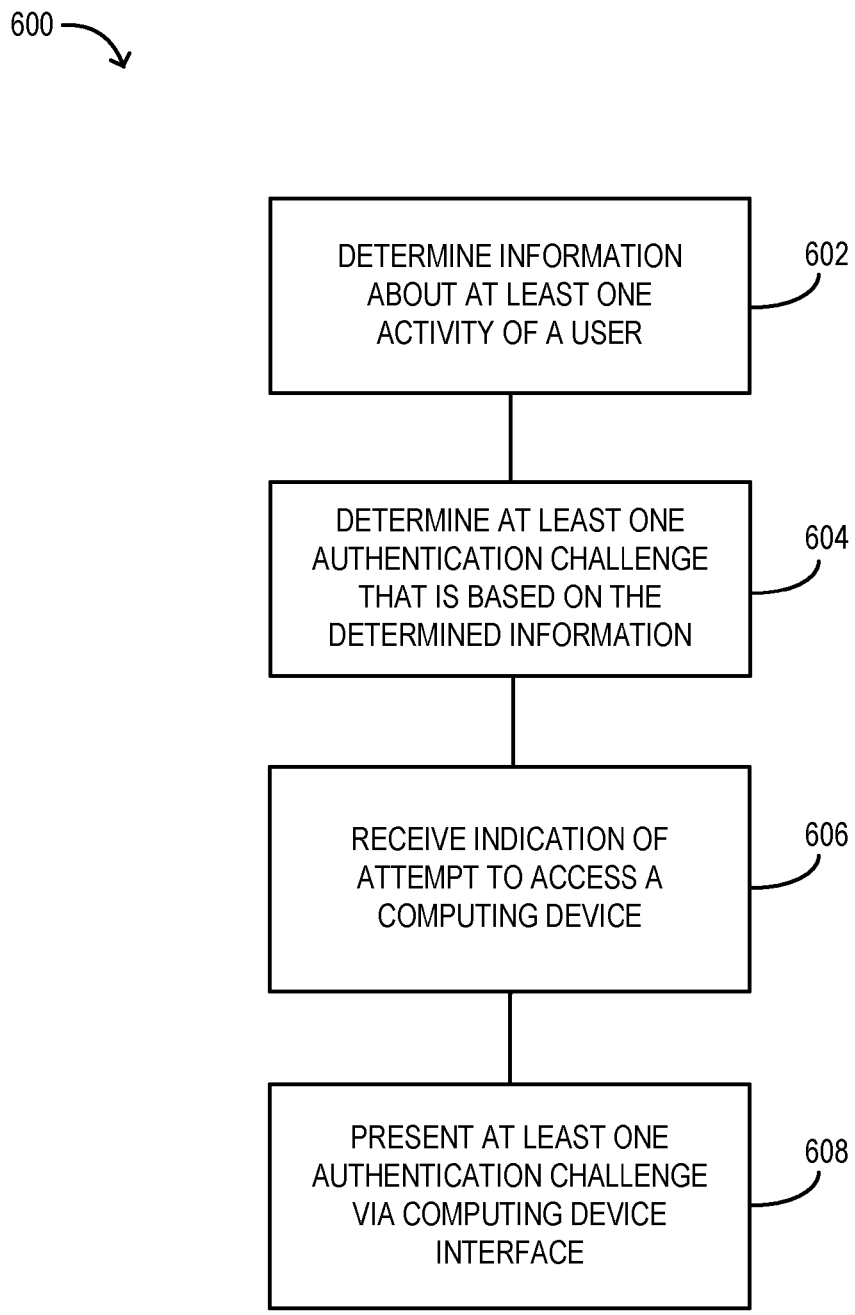
FIG. 6 is a flowchart of a method according to an embodiment of the present invention.

Referring now to FIG. 6, a flow diagram of a method 600 according to some embodiments is shown. For purposes of brevity, the method 600 will be described herein as being performed by a mobile device (e.g., a cell phone). It should be noted that although some of the steps of method 600 may be described herein as being performed by a client computer while other steps are described herein as being performed by another computing device, any and all of the steps may be performed by a single computing device which may be a mobile device, server computer, third party data device or another computing device. Further any steps described herein as being performed by a particular computing device may be performed by a human or another computing device as appropriate.

According to some embodiments, the method 600 may comprise determining information about at least one activity of a user, at 602. In some embodiments, such information may include information about use of a mobile device by a user (e.g., search history, call log). In one embodiment, the method 600 may further comprise storing some or all such information in at least one storage device (e.g., locally on a storage device of a cell phone and/or remotely at a server computer and/or third-party data device). Accordingly, in some embodiments determining the information about activity may comprise accessing, retrieving and/or receiving stored information (e.g., from a memory device of a cell phone).

As discussed variously in this disclosure, the information about the at least one activity of the user may include, without limitation, one or more of the following types of information:

a type of application used by the user (e.g., a calendar application, an email application, a browser application)

an identifier that identifies an application used by the user a respective time the activity took place (e.g., 2010-12-20 at 3:36 p.m.)

a respective length of time for which the activity took place (e.g., 7 minutes)

a respective period of time during which the activity took place (e.g., within the last month, within the last two weeks, within the current calendar year)

an identifier that identifies a subject of a digital image taken by the user (e.g., a name of a friend or child of a user, a name of a building)
an identifier that identifies a subject of a photograph taken by the user
an identifier that identifies a subject of a video taken by the user
an identifier that identifies an individual with whom the user communicated (e.g., a name of someone the user sent an email to)
an identifier that identifies a company with which the user communicated
an email message
a text message
an instant message
a communications address (e.g., a telephone number, IP address, social network account name)
a telephone number
an internet protocol (IP) address
an identifier that identifies a recipient of a communication from the user
an identifier that identifies a sender of a communication to the user
an identifier that identifies an individual associated with an appointment that is associated with the user (e.g., a name of another invitee for a meeting)
a calendar event or appointment
an identifier that identifies an appointment of the user
an identifier that identifies a future appointment of the user
an identifier that identifies a past appointment of the user
a scheduled time of an appointment (e.g., 5:45 p.m.; 7 a.m. to 8 a.m.)
a task associated with the user
a reminder associated with the user (e.g., a personal reminder)
a type of appointment (e.g., recurring or single)
an identifier that identifies a recurring appointment of the user
an identifier that identifies a website visited by the user (e.g., a URL, an IP address)
a type of website (e.g., retailer website, news website)
at least one Internet search conducted by the user
at least one term searched for by the user via a communications network
at least one search of a computing device conducted by the user
at least one term searched for by the user via a computing device (e.g., a contact a user searched for on his cell phone)
a check-in by the user via a social network (e.g., a check-in via a social network service such as FACEBOOK or FOURSQUARE)
an identifier that identifies a social networking account of the user (e.g., a FACEBOOK or TWITTER account name)
an identifier that identifies a social networking group
an identifier that identifies a member of a social networking service (e.g., other than the user)
an identifier that identifies a social networking application accessed by the user
an identifier that identifies an electronic file (e.g., a filename and/or filepath of a file)
a type of electronic file (e.g., MP3, word processing file)
a data folder or addressable data location (e.g., a user folder),
a preference of the user for a type of music
a preference of the user for a type of video
an identifier that identifies a media file
an identifier that identifies a video file accessed by the user
an identifier that identifies an audio file accessed by the user
an identifier that identifies a media playlist
a type of media file (e.g., audio, video, music, document)
an identifier that identifies a merchant from whom the user made a purchase
an amount of a purchase made by the user,
a date of a purchase made by the user,
a shipping address for a purchase made by the user,
a description of a purchase made by the user,
a shipping preference of a user,
a description or identifier that identifies a purchase for an amount larger than a predetermined (e.g., user- or system-defined) amount
an identifier that identifies a financial account associated with the user
a credit card number that identifies a credit card account of the user
an identifier that identifies a location of the mobile device
an identifier that identifies a location of the user
GPS coordinates
an identifier that identifies a group of which the user is a member.

In accordance with some embodiments, any one or more data sources may be used for deriving any authentication challenge and/or appropriate response to an authentication challenge. For example, the "correct" answer generated by an authentication system for "What is your favorite restaurant?" may be based on information from one or more of financial records (e.g., credit card statements), GPS tracking/mapping history, social network check-ins, and/or calendar data (e.g., based on the "location" field of an appointment).

In accordance with some embodiments, deriving an authentication challenge and/or appropriate response to an authentication challenge may comprise identifying one or more activities that appear to deviate from the user's typical activity. For example, if a user typically spends less than five minutes using a browser application, but on one recent occasion spent more than an hour browsing the Internet, the user may be more likely to remember the atypically long browser session. Accordingly, the unusual (for the user) activity may be used to generate an authentication challenge, such as "What day did you spend sixty-five minutes online?" Typical behavior may be analyzed, for example, using any of various statistical techniques known in the art. In some embodiments, a user or system administrator may establish one or more ranges or thresholds useful in defining what particular activities may be useful for deriving authentication challenges. For example, a user may record a preference for generating challenge questions related to any scheduled meeting with less than five or more than fifteen participants, as such meetings would be more likely to stand out in the user's memory.

In some embodiments, the information about the at least one activity of the user does not comprise one or more of the following: a password selected previously by the user for use in accessing at least one locked function of the mobile device and a password transmitted previously to the user for use in accessing at least one locked function of the mobile device. Although many types of security applications may require a user to establish (e.g., through a set up process) one or more static questions (e.g., "What is your password?"; "What is your favorite color?") and their respective answers, for the specific purpose of having those pre-established questions provided to the user as necessary to prevent unauthorized access, various embodiments of the authentication challenge functions described in this disclosure do not require that a user pre-establish such information. Advantageously, some embodiments described in this disclosure may instead generate dynamically authentication challenges and/or corresponding correct responses to such challenges, based on information about activity of the user, without establishing first with the user what those specific challenges or responses will be.

The method 600 may further comprise determining an authentication challenge based on the determined information, at 604. This determination may be made prior to, or in response to, a trigger event such as a user attempting to access an email application, or unlock a display screen of a cell phone or other computing device. In some embodiments, determining an authentication challenge may comprise determining one or more preferences of a user (e.g., a cell phone owner, a system administrator), such as a preference for a level of security, a preference for a number of questions, a preference for a topic or type of challenge (e.g., what type(s) of applications will be the subject of the challenges) and/or a preference for a challenge format (e.g., multiple choice; Yes/No), and determining the authentication challenge based on the one or more preferences.

In one embodiment, determining an authentication challenge comprises analyzing the determined information and identifying one or more of a pattern, plurality of occurrences, repetition and/or at least one common characteristic among a plurality of activities. For example, deriving an authentication challenge may comprise, without limitation, identifying the most frequent telephone numbers called (e.g., within a given period of time), the contacts most frequently called, the invitees most commonly invited to the same appointments as the user, a plurality of calls made within a particular time frame, activities of at least a minimum preferred duration (e.g., telephone calls of a minimum length of ten minutes) and the like. In accordance with some embodiments, identifying more common events or characteristics of activities, or activities that may have taken more time, may be useful in generating authentication challenges whose correct responses the user is more likely to recall.

In some embodiments, determining the at least one authentication challenge may comprise generating a new authentication challenge in response to an attempt to access a computing device. In other embodiments, a previously generated authentication challenge (e.g., stored in an accessible storage device) may be retrieved or otherwise selected for use in challenging the individual. Challenges may be repeated, in accordance with some embodiments, and/or may have to be changed with a desired frequency.

In one example of determining an authentication challenge, the authentication challenge may be derived based on behavior and/or timing. For example, in the month of May, a determined question could be "Who has a birthday in May?" and the correct answer(s) could be derived from a contact list and an appropriate corresponding field for storing a date of birth and/or from calendar appointments for May (e.g., where an associated category is "Birthday" or the like). In another example of determining an authentication challenge, one or more databases (e.g., contact list, calendar, notes) may be analyzed to determine one or more tags, categories or other labels (e.g., a tag "Best Friend") and a corresponding question could be generated (e.g., "Which of the following are your best friends?"). It will be understood, in light of this disclosure, that the appropriate answer to a given authentication challenge may change from time to time (e.g., a user's "best friend" contacts may change over time).

Some examples of authentication challenges in accordance with some embodiments (e.g., challenges or questions for which a user has not previously explicitly or otherwise intentionally established a fixed "correct" answer) may include, without limitation:

Do you purchase a monthly commuter pass?
Which transportation do you take to and from work?
Did you purchase a monthly commuter pass this month?
How do you purchase your monthly commuter pass?
Which commuter train do you ride regularly?
Do you know anyone who lives in (name of town or city)?
Who lives in (name of state, town or city)?
Which organization's dinner do you usually attend?
Which organization's dinner do you usually attend in <month>?
Which organization's dinner did you attend last month?
Which annual conference do you usually attend?
In which month do you travel the most?
In which month do you usually take vacation?
Who is your oldest (in age) friend?
Who is your oldest (longest known) friend?
What is your favorite restaurant?
What is your favorite type of food?
Which is your favorite night to eat out?
From where do you order pizza the most?
How do you order movies?
What movie chain do you frequent?
Which movie theatre do you go to most?
Which movie theatre did you go to last?
What is your favorite store?

The method 600 may further comprise receiving an indication of an attempt to access a computing device, at 606. As discussed variously in this disclosure, a trigger event may comprise a request or other attempt to access one or more functions of a cell phone or other computing device to which an authentication challenge may be provided.

The method 600 may further comprise presenting the at least one authentication challenge via a computing device interface (e.g., cell phone display screen), at 608. For example, an authentication challenge based on the stored information about use of a cell phone may be presented as a dialog box, as depicted in FIG. 1A or FIG. 1B. Alternatively, or in addition, authentication challenges may be presented using audio, video or other means of outputting the challenges as deemed desirable for particular computing devices.

In some embodiments, as discussed in more detail below, one or more responses to an authentication challenge may be received and/or assessed against a response associated with the challenge (e.g., a "correct" answer derived from the determined information and stored in a storage device). Alternatively, in some embodiments an associated response may not be determined until after a response is received from a user (e.g., the system may not determine the correct answer to the challenge of "How many calls did you make to your wife yesterday?" until after a user's response is received).

Figure 7:
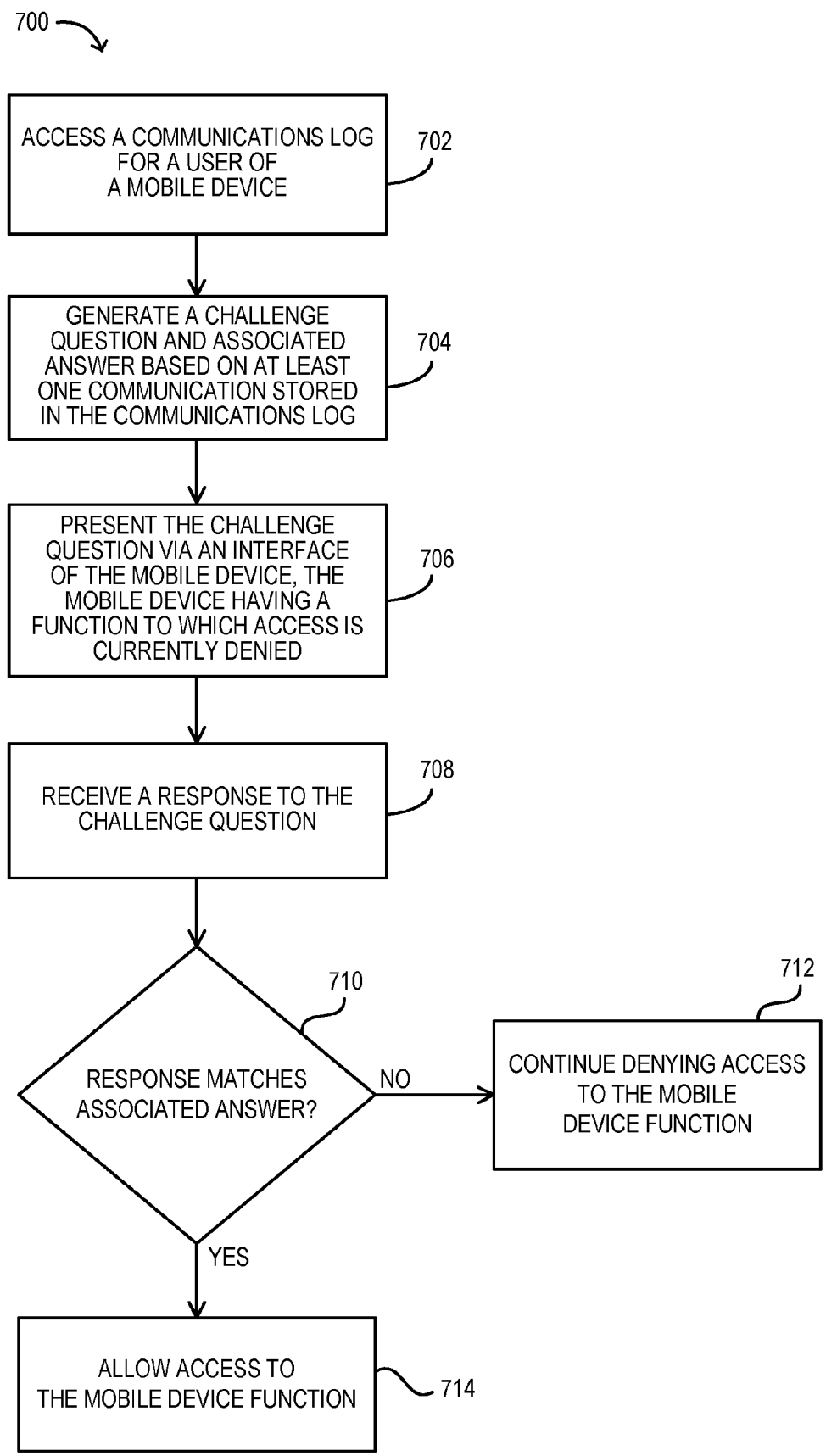
FIG. 7 is a flowchart of a method according to an embodiment of the present invention.

Referring now to FIG. 7, a flow diagram of a method 700 according to some embodiments is shown. It should be noted that although some of the steps of method 700 may be described herein as being performed by a mobile device while other steps are described herein as being performed by another computing device, any and all of the steps may be performed by a single computing device which may be a client computer, server computer, third party data device or another computing device. Further any steps described herein as being performed by a particular computing device may be performed by a human or another computing device as appropriate.

According to some embodiments, the method 700 may comprise accessing a communications log(e.g., a phone call log, an email or instant messaging history) for a user of a mobile device, at 702. The method 700 may further comprise generating a challenge question and associated answer based on at least one communication (e.g., an email) stored in the communications log, at 704. In one example, a question and the associated (correct) answer (e.g., "YES", "JOHN DOE") may be stored in one or more databases accessible by a processor (e.g., of a cell phone) executing authentication challenge instructions 212.

The method 700 may comprise presenting the challenge question via an interface of the mobile device, the mobile device having at least one function to which access is currently denied (e.g., a touch screen display is locked), at 706. Various ways of presenting the challenge question to a user are discussed in this disclosure, and others will be understood in light of this disclosure. The method 700 may comprise receiving a response to the challenge question (e.g., a "YES" input, an indicated selection of a presented name or image), at 708. The method 700 may comprise determining whether the response matches the associated answer, at 710, and if not, continuing denying access to the mobile device function, at 712. Otherwise, if the response matches the answer, the user is allowed access to the mobile device function, at 714.

Additional Embodiments

Although some of the examples provided in this disclosure may be discussed in the context of mobile devices (e.g., cell phones) and communications systems for mobile devices, according to one or more embodiments, authentication challenges based on at least one activity of a user may be used in controlling access of a user to one or more functions of many different types of computing devices.

For example, log in processes for gaining access to home and/or corporate computers, servers, applications, databases and/or networks may comprise the use of authentication challenges, as described in this disclosure, that are based on information about one or more activities of a user. For instance, a company may monitor and store information about Internet searches and other activities conducted by its employees, and generate authentication challenges dynamically based on the monitored activity, in accordance with some embodiments as discussed in this disclosure, and present the challenges to users via interfaces at personal or workstation computers, laptop computers, server computers, etc.

In another example, where a company's central communications/productivity application (e.g., OUTLOOK by MICROSOFT) is used by the employees to schedule meetings, a security application for providing authentication challenges may, rather than relying on memorized passwords, query the corporate calendar database, identify recurring meetings that were recently initiated by a given user (making the meetings more likely to be remembered by the user), and generate challenges for the user based on information about the identified meetings (e.g., "Does your weekly corporate reporting meeting with J. Doe, M. Williams and S. Smith occur in Smith's office?").

Other example questions related to appointments, and not limited to any implementation with any particular type of computing device, may include questions about regularly invited attendees of a recurring meeting and/or the time(s) of scheduled (past or future) meetings.

Internet websites often rely on a user's providing of a log-in name and password in order to allow the user to purchase products and services on-line, or access restricted content. Some websites have supplemented the security provided by the conventional username and password security by requiring users to set up one or more additional challenge questions. Typically a user must select a pre-established question (e.g., "What was the name of your high school?") or create a new question, and also submit to the website the answer with which the user will respond to the question when challenged with the question in the future. Other websites similarly rely on verification processes of credit card or other financial account processing systems (e.g., VERIFIED by VISA, SECURECODE by MASTERCARD) for securing on-line purchases using a PIN code, or answering pre-established questions with pre-established answers, as discussed above.

According to some embodiments, a desired level of security and usability may be facilitated for online purchases and/or access to restricted content of a website (e.g., accessed via a browser application of an Internet-capable cell phone or personal computer) by the use of the authentication challenges described in this disclosure. In some embodiments, data including information about prior purchases by a user from one or more on-line retailers may be used in creating authentication challenges. For example, in response to an indication that a user would like to purchase a plasma television from an on-line retailer, an authentication challenge application (e.g., operated by or on behalf of the on-line retailer and/or the user's credit card issuer) queries the order history of the user with the on-line retailer and identifies at least one recent purchase by the user. For instance, the application may be configured to identify purchases having a purchase price greater than a predetermined amount (e.g., $150), in order to select purchases the user is more likely to remember, and generates one or more challenges based on the selected purchase history (e.g., "Did you recently purchase a snow blower from BuyIt.com?"). Questions may be based on various aspects of the purchase history, including but not limited to, the types of items purchased, the time of purchase, the period during which the purchases were made (e.g., during the last two weeks), the form of payment (e.g., which credit card was used), the shipping destination of the product.

According to some embodiments, as discussed in this disclosure, the authentication challenge program may receive an indication or otherwise determine that a user has provided an incorrect response to one or more authentication challenges. In some embodiments, an indication that an incorrect response has been received may be transmitted to a central controller (e.g., server computer 252), to one or more users associated with the computing device at which the incorrect response was received (e.g., an individual registered with a wireless communications carrier as being the owner of or otherwise associated with a given cell phone or telephone number) and/or to one or more administrators of a device and/or network security system (e.g., a computer security professional). In some embodiments, an indication of a failed access attempt may be transmitted instead of, or in addition to, locking or retaining a lock on a mobile device or other computing device. In this way, a user and/or a third party security administrator may be apprised of the failed attempt and take appropriate action (e.g., disabling or clearing data and/or functions of a cell phone remotely; contacting a registered owner or user of a computing device by telephone or email). In some embodiments, at least one action is stored, to be taken in response to one or more incorrect responses. For example, a cell phone owner or system administrator may store a preference that upon receiving two incorrect responses to authentication challenges, some or all of the data stored in the cell phone (e.g., contact lists, appointments, email) may be deleted, or the cell phone completely reformatted (e.g., wiped).

In one embodiment, in response to providing an incorrect response to an authentication challenge, a user may be provided with the same challenge again and/or may be required to answer one or more different authentication challenges.

In one embodiment, a process provides for identifying information derived from every-day user activities (e.g., making and receiving phone calls, sending and receiving emails/text messages, visiting websites, conducting internet searches, downloading and using applications/games, conducting online purchases) and presenting that information to the user in the form of a question or series of questions. Questions may be derived from local or centralized data sources and the question format (e.g., true/false, yes/no, multiple choice, fill in the blank, graphical/pictures), question topic (e.g., phone calls, emails, contact lists) and number of questions asked could be based on user/system administrator preferences and level of security desired (e.g., statistical probability of an unauthorized user guessing the correct answer(s)).

According to some embodiments, the correct answer to an authentication challenge may be considered an "intuitive password" because it is derived, established or otherwise determined (e.g., by an authentication challenge system) by a user's actions or behavior (e.g., and not by the user establishing it explicitly in a password database). In one example, an authentication challenge is designed to be challenging to anyone other than an authorized user, and the appropriate response (e.g., the intuitive password) is based on something a user has done, is doing, plans to do, has known, or knows, and preferably should be able to be recalled, derived or otherwise determined by the user without much effort. Preferably, as described herein, a user does not have to establish an intuitive password as a password or passcode with an authentication system, prior to receiving an authentication challenge. As it is not pre-established or agreed upon with a user, the user does not have to memorize an intuitive password. Further, as discussed variously in this disclosure with respect to some embodiments, the "correct" intuitive password may change over time (e.g., without input, agreement or involvement of the user), even for the same authentication challenge. An intuitive password may be based on various types of information, as discussed in this disclosure, including, without limitation, a user's behaviors, actions, likes, dislikes, movements, travels, habits, events, milestones, work assignments, purchases, and/or financial behavior. Again, since the authentication system is data-driven, intuitive passwords (and/or the corresponding challenges) may be varied automatically based on a predefined set of criteria or a set of defaults.

In some embodiments, authentication challenges and/or correct answers (e.g., intuitive passwords) may be updated automatically based on preferences of a user and/or system administrator, such as in accordance with a user-defined schedule or an automatically assigned schedule. For example, a schedule could require changes constantly, according to a scheduled time period (e.g. weekly, monthly), based on one or more an event triggers (e.g., a birthday, an anniversary), based on one or more data triggers (e.g., once a user calls a particular telephone number three times, once a password or challenge answer is used twice), a set date, range or frequency (e.g., six months from now, on Aug. 22, 2010, every six months), and/or any combination of the above.

Interpretation

Numerous embodiments are described in this disclosure, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features of the invention that must be present in all embodiments.

Neither the Title (set forth at the beginning of the first page of this disclosure) nor the Abstract (set forth at the end of this disclosure) is to be taken as limiting in any way as the scope of the disclosed invention(s).

The term "product" means any machine, manufacture and/or composition of matter as contemplated by 35 U.S.C. §101, unless expressly specified otherwise.

The terms "an embodiment", "embodiment", "embodiments", "the embodiment", "the embodiments", "one or more embodiments", "some embodiments", "one embodiment" and the like mean "one or more (but not all) disclosed embodiments", unless expressly specified otherwise.

The terms "the invention" and "the present invention" and the like mean "one or more embodiments of the present invention."

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present disclosure, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase at least one of a widget, a car and a wheel means either (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on".

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device or article is described herein, more than one device or article (whether or not they cooperate) may alternatively be used in place of the single device or article that is described. Accordingly, the functionality that is described as being possessed by a device may alternatively be possessed by more than one device or article (whether or not they cooperate).

Similarly, where more than one device or article is described herein (whether or not they cooperate), a single device or article may alternatively be used in place of the more than one device or article that is described. For example, a plurality of computer-based devices may be substituted with a single computer-based device. Accordingly, the various functionality that is described as being possessed by more than one device or article may alternatively be possessed by a single device or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features is required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this disclosure are for convenience only, and are not to be taken as limiting the disclosure in any way.

"Determining" something can be performed in a variety of manners and therefore the term "determining" (and like terms) includes calculating, computing, deriving, looking up (e.g., in a table, database or data structure), ascertaining, recognizing, and the like.

A "display" as that term is used herein is an area that conveys information to a viewer. The information may be dynamic, in which case, an LCD, LED, CRT, Digital Light Processing (DLP), rear projection, front projection, or the like may be used to form the display. The aspect ratio of the display may be 4:3, 16:9, or the like. Furthermore, the resolution of the display may be any appropriate resolution such as 480i, 480p, 720p, 1080i, 1080p or the like. The format of information sent to the display may be any appropriate format such as Standard Definition Television (SDTV), Enhanced Definition TV (EDTV), High Definition TV (HDTV), or the like. The information may likewise be static, in which case, painted glass may be used to form the display. Note that static information may be presented on a display capable of displaying dynamic information if desired. Some displays may be interactive and may include touch screen features or associated keypads as is well understood.

The present disclosure may refer to a "control system". A control system, as that term is used herein, may be a computer processor coupled with an operating system, device drivers, and appropriate programs (collectively "software") with instructions to provide the functionality described for the control system. The software is stored in an associated memory device (sometimes referred to as a computer readable medium). While it is contemplated that an appropriately programmed general purpose computer or computing device may be used, it is also contemplated that hard-wired circuitry or custom hardware (e.g., an application specific integrated circuit (ASIC)) may be used in place of, or in combination with, software instructions for implementation of the processes of various embodiments. Thus, embodiments are not limited to any specific combination of hardware and software.

A "processor" means any one or more microprocessors, Central Processing Unit (CPU) devices, computing devices, microcontrollers, digital signal processors, or like devices. Exemplary processors are the INTEL PENTIUM or AMD ATHLON processors.

The term "computer-readable medium" refers to any statutory medium that participates in providing data (e.g., instructions) that may be read by a computer, a processor or a like device. Such a medium may take many forms, including but not limited to non-volatile media, volatile media, and specific statutory types of transmission media. Non-volatile media include, for example, optical or magnetic disks and other persistent memory. Volatile media include DRAM, which typically constitutes the main memory. Statutory types of transmission media include coaxial cables, copper wire and fiber optics, including the wires that comprise a system bus coupled to the processor. Common forms of computer-readable media include, for example, a floppy disk, a flexible disk, hard disk, magnetic tape, any other magnetic medium, a CD-ROM, Digital Video Disc (DVD), any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read. The terms "computer-readable memory" and/or "tangible media" specifically exclude signals, waves, and wave forms or other intangible or transitory media that may nevertheless be readable by a computer.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined below and includes many exemplary protocols that are also applicable here.

It will be readily apparent that the various methods and algorithms described herein may be implemented by a control system and/or the instructions of the software may be designed to carry out the processes of the present invention.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models, hierarchical electronic file structures, and/or distributed databases) could be used to store and manipulate the data types described herein. Likewise, object methods or behaviors of a database can be used to implement various processes, such as those described herein. In addition, the databases may, in a known manner, be stored locally or remotely from a device that accesses data in such a database. Furthermore, while unified databases may be contemplated, it is also possible that the databases may be distributed and/or duplicated amongst a variety of devices.

As used herein a "network" is an environment wherein one or more computing devices may communicate with one another. Such devices may communicate directly or indirectly, via a wired or wireless medium such as the Internet, LAN, WAN or Ethernet (or IEEE 802.3), Token Ring, or via any appropriate communications means or combination of communications means. Exemplary protocols include but are not limited to: Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), system to system (S2S), or the like. Note that if video signals or large files are being sent over the network, a broadband network may be used to alleviate delays associated with the transfer of such large files, however, such is not strictly required. Each of the devices is adapted to communicate on such a communication means. Any number and type of machines may be in communication via the network. Where the network is the Internet, communications over the Internet may be through a website maintained by a computer on a remote server or over an online data network including commercial online service providers, bulletin board systems, and the like. In yet other embodiments, the devices may communicate with one another over RF, cable TV, satellite links, and the like. Where appropriate encryption or other security measures such as logins and passwords may be provided to protect proprietary or confidential information.

Communication among computers and devices may be encrypted to insure privacy and prevent fraud in any of a variety of ways well known in the art. Appropriate cryptographic protocols for bolstering system security are described in Schneier, APPLIED CRYPTOGRAPHY, PROTOCOLS, ALGORITHMS, AND SOURCE CODE IN C, John Wiley & Sons, Inc. 2d ed., 1996, which is incorporated by reference in its entirety.

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

It will be readily apparent that the various methods and algorithms described herein may be implemented by, e.g., appropriately programmed general purpose computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software. Accordingly, a description of a process likewise describes at least one apparatus for performing the process, and likewise describes at least one computer-readable medium and/or memory for performing the process. The apparatus that performs the process can include components and devices (e.g., a processor, input and output devices) appropriate to perform the process. A computer-readable medium can store program elements appropriate to perform the method.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

The invention claimed is:

1. A method, comprising:
  determining information about at least one activity of a user;
  determining an authentication challenge that is based on the information about the at least one activity of the user;
  determining, based on the information about the at least one activity of the user, at least one acceptable response to the authentication challenge;
  receiving an indication of an attempt to access a mobile device; and
  in response to receiving the indication of the attempt to access the mobile device, presenting, via an interface of the mobile device, the authentication challenge that is based on the information about the at least one activity of the user,
  in which determining the authentication challenge comprises:
    determining a preference for a type of activity;
    determining, based on the respective determined information about a first activity of the user, a type of the first activity;
    determining that the type of the first activity satisfies the preference for the type of activity; and
    generating an authentication challenge based on the first activity in response to determining that the type of the first activity satisfies the preference for the type of activity.

2. The method of claim 1, further comprising:
  storing the information about the at least one activity of the user in at least one storage device.

3. The method of claim 1, in which determining the information about the at least one activity of the user comprises:
  receiving the information from a storage device of the mobile device.

4. The method of claim 1, in which determining the information about the at least one activity of the user comprises:
  receiving the information from a server computer in communication with a plurality of mobile devices.

5. The method of claim 1, in which the information about the at least one activity of the user comprises one or more of the following types of information:
  a type of application used by the user, and
  an identifier that identifies an application used by the user.

6. The method of claim 1, in which the information about the at least one activity of the user comprises one or more of the following types of information:
  an identifier that identifies at least one location of the activity,
  an identifier that identifies at least one participant in the activity,
  a description of the activity,
  a respective time the activity took place,
  a respective length of time for which the activity took place, and
  a respective period of time during which the activity took place.

7. The method of claim 1, in which the information about the at least one activity of the user comprises one or more of the following types of information:
  an identifier that identifies a subject of a digital image taken by the user,
  an identifier that identifies a subject of a photograph taken by the user, and
  an identifier that identifies a subject of a video taken by the user.

8. The method of claim 1, in which the information about the at least one activity of the user comprises one or more of the following types of information:
  an identifier that identifies an individual with whom the user communicated,
  an identifier that identifies a company with which the user communicated,
  an email,
  a text message,
  an instant message,
  a communications address,
  a telephone number,
  an internet protocol (IP) address,
  an identifier that identifies a recipient of a communication from the user, and
  an identifier that identifies a sender of a communication to the user.

9. The method of claim 1, in which the information about the at least one activity of the user comprises one or more of the following types of information:
  an identifier that identifies an individual associated with an appointment that is associated with the user,
  an identifier that identifies an appointment of the user,
  an identifier that identifies a future appointment of the user,
  an identifier that identifies a past appointment of the user,
  a scheduled time of an appointment,
  a task associated with the user,
  a reminder associated with the user,
  a type of appointment, and
  an identifier that identifies a recurring appointment of the user.

10. The method of claim 1, in which the information about the at least one activity of the user comprises one or more of the following types of information:
  an identifier that identifies a website visited by the user, and
  a type of website.

11. The method of claim 1, in which the information about the at least one activity of the user comprises one or more of the following types of information:
- at least one Internet search conducted by the user,
- at least one term searched for by the user via a communications network,
- at least one term searched for on the mobile device by the user and
- at least one term searched for by the user via the mobile device.

12. The method of claim 1, in which the information about the at least one activity of the user comprises one or more of the following types of information:
- a check-in by the user via a social network,
- an identifier that identifies a social networking account of the user,
- an identifier that identifiers a social networking group,
- an identifier that identifies a member of a social network that is not the user, and
- an identifier that identifies a social networking application accessed by the user.

13. The method of claim 1, in which the information about the at least one activity of the user comprises one or more of the following types of information:
- an identifier that identifies an electronic file,
- a favorites list,
- a type of electronic file,
- a data folder,
- a preference of the user for a type of music,
- a preference of the user for a type of video,
- an identifier that identifies a media file,
- an identifier that identifies a video file accessed by the user,
- an identifier that identifies an audio file accessed by the user,
- an identifier that identifies a media playlist, and
- a type of media file.

14. The method of claim 1, in which the information about the at least one activity of the user comprises one or more of the following types of information:
- an identifier that identifies a merchant from whom the user made a purchase,
- an amount of a purchase made by the user,
- a date of a purchase made by the user,
- a shipping address for a purchase made by the user,
- a description of a purchase made by the user,
- a shipping preference of a user,
- an identifier that identifies a financial account associated with the user, and
- a credit card number that identifies a credit card account of the user.

15. The method of claim 1, in which the information about the at least one activity of the user comprises one or more of the following types of information:
- an identifier that identifies a location of the mobile device,
- an identifier that identifies a location of the user, and
- GPS coordinates.

16. The method of claim 1, in which the information about the at least one activity of the user comprises an identifier that identifies a group of which the user is a member.

17. The method of claim 1, in which the information about the at least one activity of the user does not comprise:
- a password selected previously by the user for use in accessing at least one locked function of the mobile device.

18. The method of claim 1, in which the information about the at least one activity of the user does not comprise:
- a password transmitted previously to the user for use in accessing at least one locked function of the mobile device.

19. The method of claim 1, in which determining the authentication challenge comprises:
- determining the authentication challenge before receiving the indication of the attempt to access the mobile device.

20. The method of claim 1, in which determining the authentication challenge comprises:
- determining the authentication challenge after receiving the indication of the attempt to access the mobile device.

21. The method of claim 1, in which determining the authentication challenge comprises:
- determining a preference of a user for a level of security; and
- selecting the authentication challenge based on the preference for the level of security.

22. The method of claim 1, in which determining the authentication challenge comprises:
- determining a preference of a user for a challenge format; and
- selecting the authentication challenge based on the preference for the challenge format.

23. The method of claim 1, in which determining the information about the at least one activity of the user comprises:
- receiving first information about a first activity of the user;
- receiving second information about a second activity of the user; and
- identifying at least one common characteristic of the first activity and the second activity.

24. The method of claim 1, in which determining the authentication challenge comprises:
- determining a previous period of time;
- identifying at least one activity of the user that took place during the previous period of time; and
- generating an authentication challenge based on the respective information about the at least one activity of the user that took place during the previous period of time.

25. The method of claim 24, in which determining the previous period of time comprises:
- determining a preference of the user for a length of the previous period of time.

26. A method, comprising:
- determining information about at least one activity of a user;
- determining an authentication challenge that is based on the information about the at least one activity of the user;
- determining, based on the information about the at least one activity of the user, at least one acceptable response to the authentication challenge;
- receiving an indication of an attempt to access a mobile device; and
- in response to receiving the indication of the attempt to access the mobile device, presenting, via an interface of the mobile device, the authentication challenge that is based on the information about the at least one activity of the user,
- in which determining the authentication challenge comprises:
  - determining a preference for a duration of an activity;
  - determining, based on the respective determined information about a first activity of the user, a duration of the first activity;

determining that the duration of the first activity satisfies the preference for the duration of an activity; and generating an authentication challenge based on the first activity in response to determining that the duration of the first activity satisfies the preference for the duration of an activity.

27. A method, comprising:

determining information about at least one activity of a user;

determining an authentication challenge that is based on the information about the at least one activity of the user;

determining, based on the information about the at least one activity of the user, at least one acceptable response to the authentication challenge;

receiving an indication of an attempt to access a mobile device; and in response to receiving the indication of the attempt to access the mobile device, presenting, via an interface of the mobile device, the authentication challenge that is based on the information about the at least one activity of the user, in which determining the authentication challenge comprises:

accessing an indication of a required minimum number of occurrences of an activity;

determining, based on the respective determined information about the at least one activity of the user, a number of occurrences of a first type of activity;

determining that the number of occurrences of the first type of activity is not less than the required minimum number of occurrences; and generating an authentication challenge based on the first type of activity in response to determining that the number of occurrences of the first type of activity is not less than the required minimum number of occurrences.

28. The method of claim 1, in which determining, based on the information about the at least one activity of the user, at least one acceptable response to the authentication challenge comprises:

generating an intuitive password.

29. The method of claim 1, in which the least one acceptable response to the authentication challenge is not a password previously established by the user as an acceptable response.

30. The method of claim 1, in which the authentication challenge is not previously established by the user for use as a challenge.

31. The method of claim 1, in which the authentication challenge comprises at least one question about personal knowledge of the at least one activity of the user.

32. The method of claim 1, in which the at least one acceptable response comprises information about the at least one activity of the user.

33. The method of claim 1, in which the authentication challenge does not comprise a human authentication challenge.

34. An apparatus comprising:

a processor; and a computer-readable memory in communication with the processor, the computer-readable memory storing instructions that when executed by the processor result in:

determining information about at least one activity of a user;

determining an authentication challenge that is based on the information about the at least one activity of the user;

determining, based on the information about the at least one activity of the user, at least one acceptable response to the authentication challenge;

receiving an indication of an attempt to access a mobile device; and in response to receiving the indication of the attempt to access the mobile device, presenting the authentication challenge that is based on the information about the at least one activity of the user, in which determining the authentication challenge comprises:

determining a preference for a type of activity;

determining, based on the respective determined information about a first activity of the user, a type of the first activity;

determining that the type of the first activity satisfies the preference for the type of activity; and generating an authentication challenge based on the first activity in response to determining that the type of the first activity satisfies the preference for the type of activity.

35. A non-transitory computer-readable memory storing instructions that when executed by a computer comprising at least one processor result in: determining information about at least one activity of a user; determining an authentication challenge that is based on the information about the at least one activity of the user; determining, based on the information about the at least one activity of the user, at least one acceptable response to the authentication challenge; receiving an indication of an attempt to access a mobile device; and in response to receiving the indication of the attempt to access the mobile device, presenting, via an interface of the mobile device, the authentication challenge that is based on the information about the at least one activity of the user~ in which determining the authentication challenge comprises: determining a preference for a type of activity; determining, based on the respective determined information about a first activity of the user, a type of the first activity; determining that the type of the first activity satisfies the preference for the type of activity; and generating an authentication challenge based on the first activity in response to determining that the type of the first activity satisfies the preference for the type of activity.

36. The method of claim 1, in which determining the preference for the type of activity comprises:

determining a preference, of a user of the mobile device, for the type of activity.

* * * * *